United States Patent [19]
Rappaport et al.

[11] Patent Number: 5,233,628
[45] Date of Patent: Aug. 3, 1993

[54] COMPUTER-BASED BIT ERROR SIMULATION FOR DIGITAL WIRELESS COMMUNICATIONS

[75] Inventors: Theodore S. Rappaport; Victor Fung; Michael D. Keitz, all of Blacksburg, Va.

[73] Assignee: Virginia Polytechnic Institute and State University, Blacksburg, Va.

[21] Appl. No.: 706,806

[22] Filed: May 29, 1991

[51] Int. Cl.$^5$ ...................... H04B 17/00; G06F 11/00
[52] U.S. Cl. .......................................... 375/10; 371/23
[58] Field of Search .................. 375/10; 371/5.1, 20.1, 371/23; 364/578, 405.05

[56] References Cited

U.S. PATENT DOCUMENTS

| | | | |
|---|---|---|---|
| 3,562,710 | 4/1968 | Halleck | 371/5.1 |
| 4,061,892 | 12/1977 | Bradley | 324/57 N |
| 4,091,240 | 5/1978 | Lainey et al. | 179/15 RF |
| 4,092,605 | 5/1978 | Donnelly | 328/152 |
| 4,377,822 | 3/1983 | Noirel et al. | 358/139 |
| 4,428,076 | 1/1984 | Schuon | 371/5.1 |
| 4,653,075 | 3/1987 | Wisniewski | 375/110 |
| 4,663,775 | 5/1987 | Olek | 379/24 |
| 4,868,854 | 9/1989 | Imai et al. | 375/118 |
| 4,907,247 | 3/1990 | Miyake et al. | 375/10 |
| 4,920,537 | 4/1990 | Darling et al. | 371/5.1 |
| 5,005,197 | 4/1991 | Parsons et al. | 379/21 |
| 5,025,453 | 6/1991 | Hurinville | 371/5.1 |

OTHER PUBLICATIONS

Rappaport et al, "Statistical Channel Impulse Response Models for Factory and Open Plan Building Radio Communication System Design," IEEE Trans on Comm., vol. 39, No. 5, May 1991.
Smith, "A Computer Generated Multipath Fading Simulation for Mobile Radio," IEEE Trans on Veh. Tech., vol. VGT-24, No. 3, Aug. 1975.
Arredondo et al., "A Multipath Fading Simulator for Mobile Radio," IEEE Trans. on Comm., vol. COM-21, No. 11, Nov. 1973.
Cox, "910 MHz Urban Mobile Radio Propagation: Multipath Characteristics in New York City," IEEE Trans. on Comm., vol. COM-21, No. 11, Nov. 1973.

Primary Examiner—Curtis Kuntz
Assistant Examiner—T. Ghebretinsae
Attorney, Agent, or Firm—Whitham & Marhoefer

[57] ABSTRACT

A communications stimulation system allows a user to perform a quantitative or subjective test of digital baseband devices over wireless channels using actual measured or modeled propagation data. The digital wireless communication simulation system is capable of simulating the transient nature of channels and radio hardware so that loss of synchronization can be included in the simulation. The simulator is a combination of computer software and hardware that computes a convolution, in the time domain, of a sequence of binary digits or data symbols (i.e., the data stream) with a computer model of a radio transmitter, a propagation channel or channels and a receiver. The transmitter typically comprises a coder, a pulse shaper, a modulator, and a spreader. The propagation channel or channels may include impulsive and average noise levels, co-channel interference and adjacent interference levels, fading and multipath propagation events, and non-linear channel and radio system effects. The receiver system typically comprises at least a filter bank, a demodulator, a despreader, a synchronizer, a detector, and a decoder. The data stream may either be random or applied by the user. The software computes the bit-by-bit sequence for replay at a later time. Once stored, the bit-by-bit error sequence can be clocked through a hardware data port and compared with an applied data stream in real time. The output of the hardware data port is a real time sequence of bits that has errors due to the bit-by-bit simulation computed earlier by the software.

12 Claims, 19 Drawing Sheets

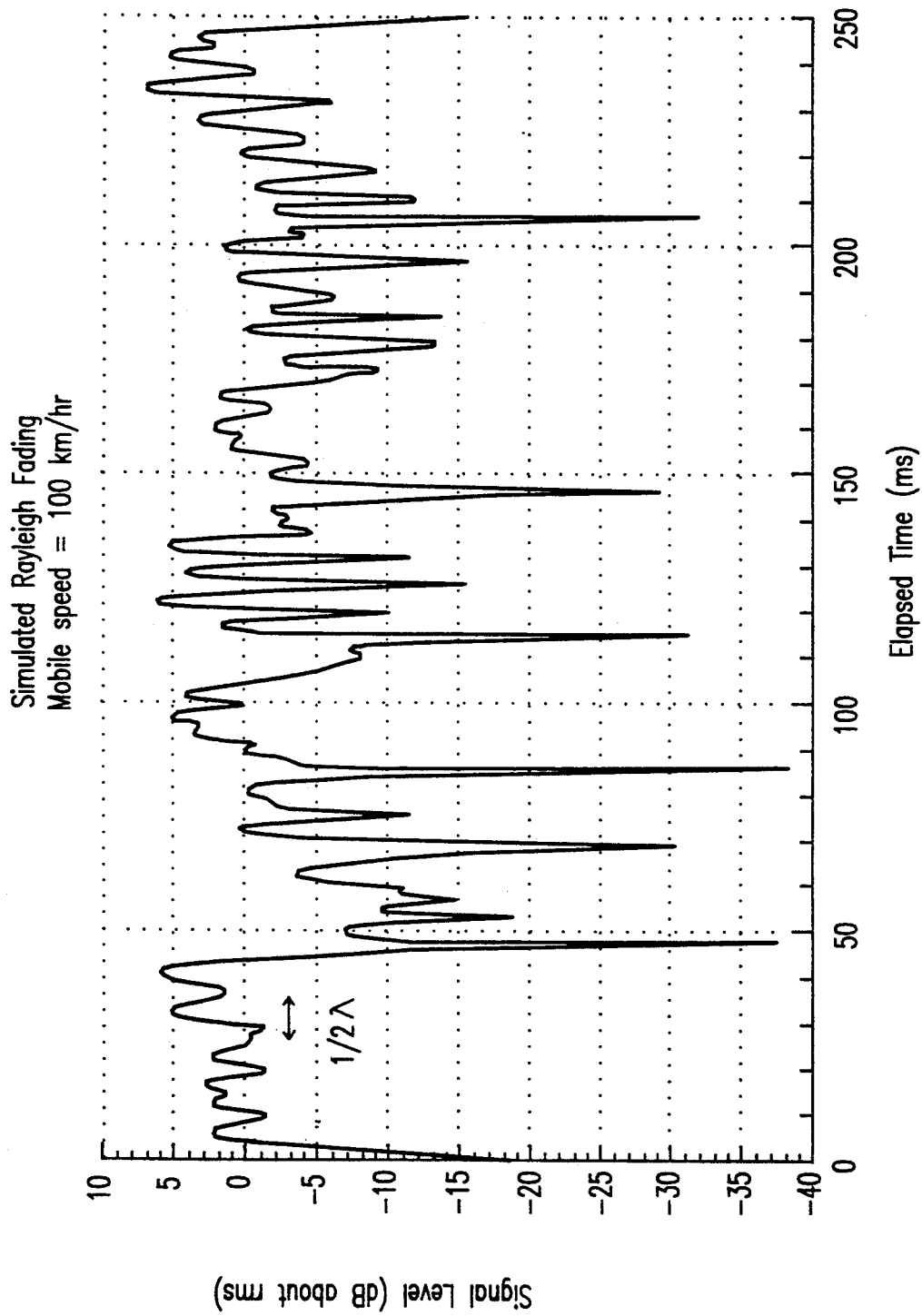

COMPUTER-BASED BIT ERROR SIMULATION FOR DIGITAL WIRELESS COMMUNICATIONS

BACKGROUND OF THE INVENTION

1. Field of the Invention

The present invention generally relates to a method and apparatus for the simulation of the real-time error performance of digital data transmitted over radio links and, more particularly, to a system which allows the user to evaluate the performance of digital radio communications systems in real time in a laboratory thereby avoiding the need for expensive field measurements on prototype radio equipment.

2. Description of the Prior Art

Frequency-selective fading and flat fading are known to exist in portable radio communication channels. These propagation effects can cause bit errors in digital radio communications. When the bandwidth of the transmitted data stream is larger than the coherence bandwidth of the channel, frequency-selective fading will occur. Frequency-selective fading causes signal spreading and, as a result, introduces intersymbol interference (ISI) and bit errors in received signals. On the other hand, if the bandwidth of the data is much less than the bandwidth of the channel, flat fading will occur. Although the flat fading channel will not cause any signal spreading in the transmitted signal, the fading along with the added thermal and impulse noise in the channel can still cause bit errors, as can imperfect filters. For data transmission systems, the error bursts due to reception during signal nulls of a fading channel are a primary concern, and understanding the burstiness of the channel is necessary to implement successful antenna diversity and/or coding techniques. In addition, mobile and indoor channels are subject to rapid changes in signal strength and multipath conditions.

As demand grows for digital wireless communications systems, the accurate prediction of average and instantaneous bit error rates (BER) for different modulation schemes becomes increasingly important in system design. For example, the extent of coding required for U.S. digital cellular data products will depend on the quality of transmission sustained in mobile channels. BER predictions not only provide an understanding of the performance of the modulation method and coding requirements in the operating environment, but also reveals the limits of data rate and channel capacity.

Currently, communications companies and various government agencies have an urgent need to test proposed speech and video coding in digital modulation communication systems. The communications technologies range from the proposed new digital cellular standard to high definition television (HDTV). Presently, one needs to perform expensive field measurements on prototype radio equipment or use complicated hardware simulators in conjunction with prototype radio equipment to test the digital transmission quality of new services over radio links.

It is known in the prior art to use a statistical model for channel and noise levels in the operating environment. T. S. Rappaport, S. Y. Seidel and K. Takamizawa describe examples in "Statistical Channel Impulse Response Models for Factory and Open Plan Building Radio Communication System Design", *IEEE. Trans. Commun.*, vol. COM-39, no. 5, May 1991, See also J. I. Smith, "A Computer Generated Multipath Fading Simulation for Mobile Radio", *IEEE Trans. Veh. Techno.*, vol. VT-24, no. 3, Aug. 1975, pp. 39-40, and G. A. Arrendondo and W. H. Chriss, "A Multipath Fading Simulator for Mobile Radio", *IEEE Trans. Commun.* vol. COM-21, no. 11, Nov. 1973, pp. 1325-1328.

Existing simulators allow real-time generation of bit errors; however, these simulators do not simulate any radio systems. They only generate errors (or bursts of errors) at random. It is left to the user to determine the simulator settings to produce a very rough approximation of the radio transmission. The existing simulators are therefore very limited in their ability to simulate bursty errors that occur in a mobile channel.

SUMMARY OF THE INVENTION

It is therefore an object of the present invention to provide a system that permits quantitative or subjective test of digital baseband services or devices even before a working prototype of proposed new wireless communication equipment is available.

It is another object of the invention to provide a communications simulation system which allows a user to perform a quantitative or subjective test of digital baseband devices over wireless channels using actual measured or modeled propagation data.

It is a further object of the invention to provide a digital wireless communication simulation system which allows the user to input actual field measurements and then predicts actual system performance based on the field-measured data.

It is yet another object of the instant invention to provide digital communication simulation system capable of simulating the transient nature of channels and radio hardware so that loss of synchronization and imperfect components can be included in the simulation.

The simulator according to the invention relies on sophisticated computer software and hardware that computes a convolution, in the time domain, of a sequence of binary digits (i.e., the data stream) with a computer model of a radio transmitter, a propagation channel or channels and a receiver. The transmitter typically comprises a modulator, a pulse shaper and a coder. The propagation channel or channels may include impulsive and average noise and their statistics or levels, co-channel and adjacent channel interference and their statistics or levels, fading and multipath propagation events, and non-linear channel effects. Channel characteristics may be calculated with a statistical model, entered from measured data, or predicted by a site-specific model. The receiver system typically comprises at least a filter bank, a demodulator, a synchronizer, a detector, and a decoder. The data stream may either be random or applied by the user. If random data is used, the software computes the bit-by-bit sequence for replay at a later time. If the user's actual data is processed instead, the errored version can be recovered for further analysis and playback. Once stored, the bit-by-bit error sequence can be clocked through a hardware data port and compared with an applied data stream in real time. The output of the hardware data port is a real time sequence of bits that has errors due to the bit-by-bit simulation computed earlier by the software.

For example, to test a facsimile machine that complies with the 1991 IS-54 U.S. digital cellular standard, the simulator according to the invention could be used to generate bit error sequences for various vehicle speeds or various multipath channels. The performance of different data coding (error control) schemes can then be evaluated using the software and hardware so that a manufacturer can determine the performance of its product. In another application, the simulator according to the invention could be used to simulate a wide variety of modulation and radio channel conditions, allowing high definition television (HDTV) manufactures to test the performance of their source (i.e., video) coding. The simulator can be easily converted into a radio network analyzer or protocol analyzer with the appropriate software shell, or multiple simulators could be interconnected forming a simulated network. The simulator allows performance comparisons between different modulation and multiple access techniques for mobile and portable radio channels.

BRIEF DESCRIPTION OF THE DRAWINGS

For example, binary phase shift keyed direct sequence spread spectrum modulation can be simulated using bit-by-bit error analyses, and frequency shift keyed compared with frequency hopping modulation.

The foregoing and other objects, aspects and advantages will be better understood from the following detailed description of a preferred embodiment of the invention with reference to the drawings, in which:

FIG. 10 is a graph showing typical simulated Rayleigh fading;

DETAILED DESCRIPTION OF A PREFERRED EMBODIMENT OF THE INVENTION

Figure 1:
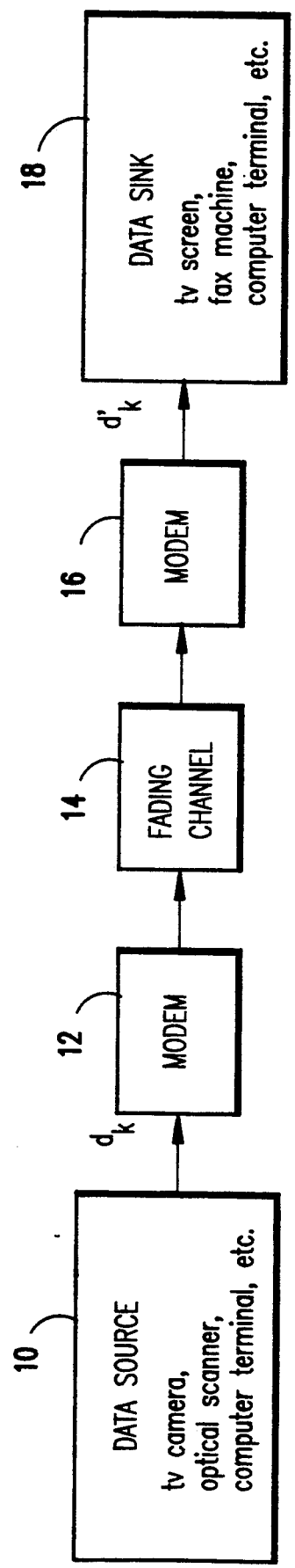
FIG. 1 is a block diagram of a digital communication system.

Referring now to the drawings, and more particularly to FIG. 1, there is shown a typical digital wireless communications system. A data source 10, such as a television camera, an optical scanner of a facsimile machine, a computer terminal or the like, provides a data stream $d_k$ to a modem (modulator/demodulator) 12. The modulated signal is transmitted over a fading channel 14 to a modem 16 at the receiving end of the system. The modem 16 demodulates the received signal to generate a data stream $d'_k$ to a data sink 18, such as a television screen, facsimile machine, computer terminal or the like. The data stream $d'_k$ varies from the data stream $d_k$ due to fading, multipath and other errors caused by the channel 14.

Figure 2:
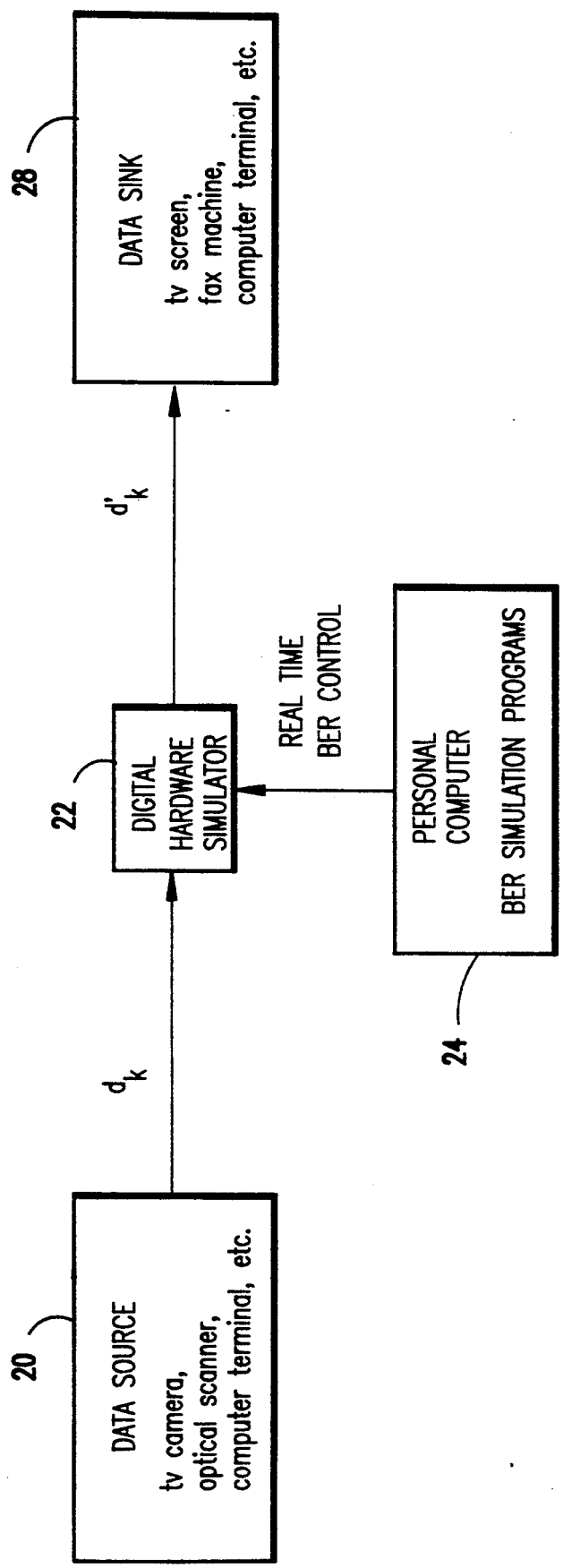
FIG. 2 is a block diagram of the baseband digital simulator system according to the invention.

FIG. 2 illustrates the digital simulator according to the present invention. A data source 20, functionally identical to data source 10, generates a data stream $d_k$ which is input not to a modem, but to a digital hardware simulator 22. The hardware simulator is controlled by a personal computer 24 programmed to provide BER control. A "personal computer" is defined, for purposes of the preferred embodiment, as one that uses the Intel 80286, 80386 or 80486 or the Motorola 68020, 68030 or 68040 series of microprocessors or equivalent microprocessors. The computer may be based on IBM's AT TM (advanced technology) personal computer or compatibles, Apple's, Macintosh TM II personal computer, or it may be a work station based on RISC (reduced instruction set computer) technology such as the Sun SPARC TM workstation. In an actual implementation of the invention, an IBM AT TM personal computer was used.

The hardware simulator 22 is implemented as a printed circuit (PC) card which plugs into an adapter slot in the AT TM computer. A previously computed bit error stream $e_k$ is stored on the computer's hard disk for access by the simulator 22. The bit error stream $e_k$ is Exclusive ORed with the data stream $d_k$ to generate a data stream $d'_k$. The hardware simulator 22 outputs the data stream $d'_k$ to a data sink 28, functionally identical to data sink 18. Thus, the simulation system is a self-contained unit, requiring only an input file to accurately predict the operation of a wireless digital communication system. No prototype hardware is required since the hardware simulator, used in conjunction with an accurate computer simulation program, working from statistically modeled, measured or site-specific predicted channel data simulates the communication system including the fading channel.

Figure 3:
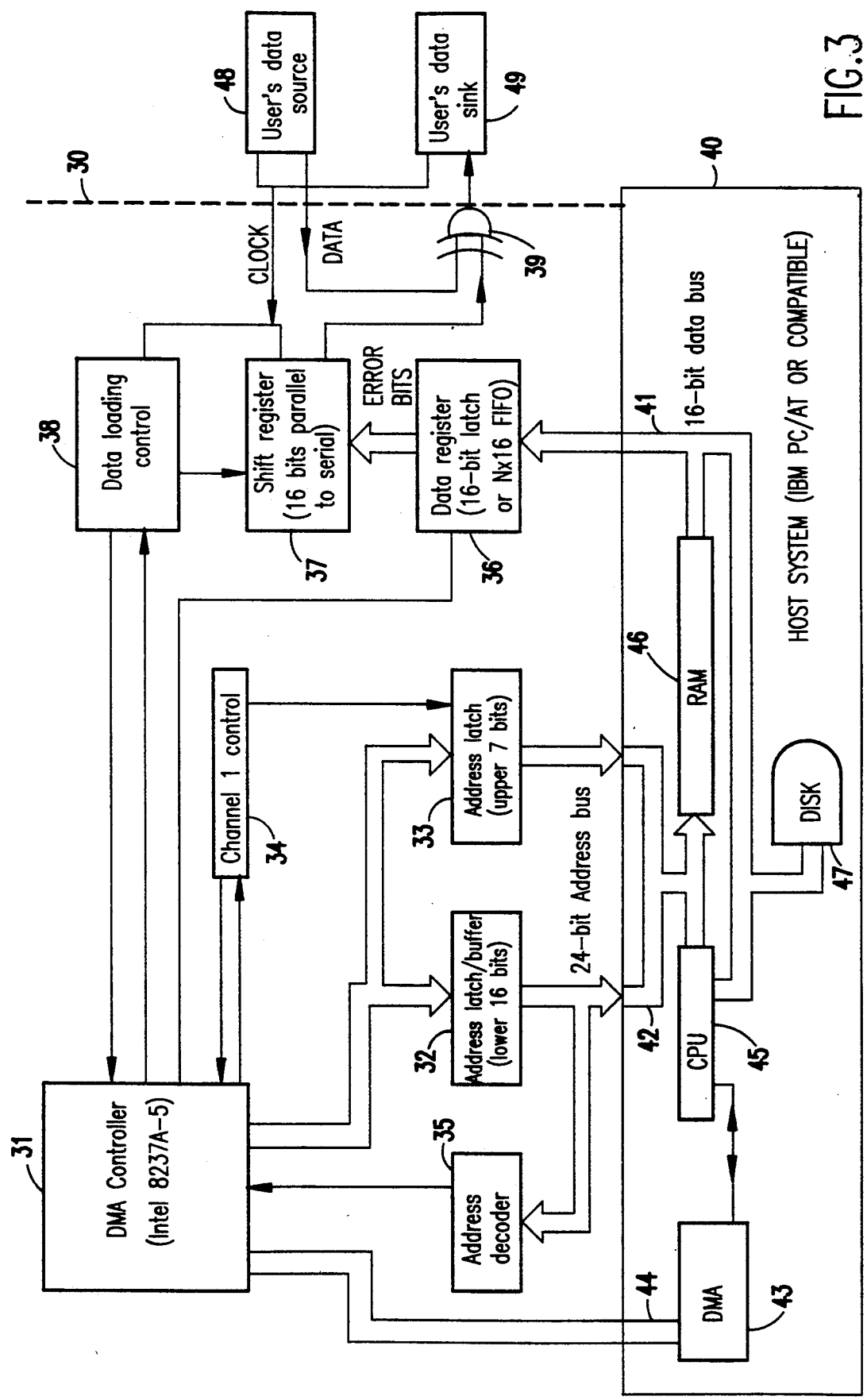
FIG. 3 is a detailed block diagram of the digital hardware simulator used in the system shown in FIG. 2.

FIG. 3 shows in more detail a preferred embodiment of the digital hardware simulator 22 implemented as a printed circuit card which plugs into a bus slot of an AT TM personal computer (i.e., the "host system"). The error simulator card provides a real-time interface between a stored bit-by-bit error file and the host system. The error file, typically stored on the computer's hard disk, is a binary file, where bits are considered one at a time sequentially. Every bit in the file corresponds to a bit sent by the user's data system. If an error bit is a binary one, an error will be introduced into the user's data stream for that bit. A bit error is defined as inverting that bit. If the file bit is zero, the user's data will pass through the error simulator unchanged. Processing of "error bits" is continuous and driven by the user's data clock. Once all the bits in the file have been used, the error sequence repeats from the beginning of the file.

The error bits must be loaded into the host system RAM (random access memory) before they can be processed by the card. The card may read data from anywhere in RAM, up to the 16 MB (megabyte) limit imposed by the personal computer architecture (for an AT TM or compatible personal computer). This means that the file must be less than approximately 14.8 MB long or approximately 100 million error bits. The card executes a DMA (direct memory access) cycle once for every sixteen error bits processed.

The card uses an Intel 8237A-5 LSI (large scale integrated) DMA controller. Two of these chips, or their logical equivalent, are already present on the host system's mother board. However, the host system's built-in DMA controller cannot be used readily because it is limited to transferring blocks of 128 KB (kilobytes) or less. In order to move larger blocks of data, extensive hardware and software synchronization would be required. However, if the error bit file is guaranteed to be shorter than 128 KB or the hardware and software synchronization is implemented, a considerably simpler version of the card could be implemented.

With reference to FIG. 3, the simulator hardware comprises a PC card 30 which plugs into one of the available bus connectors on the motherboard of a personal computer 40. The connector (not shown) is the ISA (Industry Standard Adapter) bus connector of the AT TM personal computer which is an IEEE (Institute of Electrical and Electronics Engineers) 16-bit data bus standard. The connector could be the newer EISA (Extended ISA), IBM MicroChannel TM, Apple Nu-Bus TM or similar bus connector. In the specific example shown, the connector mates with a 16-bit data bus 41 and a 24-bit address bus 42 in the personal computer. In addition, a two-line interface 44 is provided to the DMA controller 43 on the mother board of the personal computer 40. The personal computer 40 also includes, among other major components, a central processing unit (CPU; i.e., the microprocessor) 45, a random access memory (RAM) 46, and a hard disk drive 47. The CPU 45 is connected to the data bus 41, the address bus 42 and the DMA controller 43. The RAM 46 is also connected to the data bus 41 and the address bus 42, and the disk drive 47 is connected to the data bus 42.

The PC simulator hardware card 30 includes its own DMA controller 31, such as the Intel 8237A-5, which is connected to DMA controller 43 via the two-line interface 44. The DMA controller 31 is also connected to the 24-bit address bus 42 via address latch and buffers 32 and 33. Address latch and buffer 32 receives the lower address bits A1 to A16 of an address from DMA controller 31, and address latch and buffer 33 receives the address bits A17 to A23 bits of the address. Address bit A0 is always zero and is not used. The seven address bits in latch 33 are used as the page address. Address latch 33 is controlled by the DMA controller 31 via channel one control 34. In addition, address bits A1 to A16 of an address from the address bus 42 are input to an address decoder 35 which provides an output to the DMA controller 31.

The data bus 41 is connected to a data register 36 in the form of a 16-bit latch or, alternatively, a Nx16 first-in, first-out (FIFO) register. The latch 36 receives data representing the bit error stream $e_k$ which is stored on the computer's hard disk drive 47. This data is input to latch 36 under the control of DMA controller 31 and supplied to a 16-bit parallel-to-serial shift register 37 which, in turn, is loaded under the control of DMA controller 31 via data loading control 38. Both the data loading control 38 and the shift register 37 are clocked by a clock derived from the user's data source 48. The data stream $d_k$ from the user's data source 48 is Exclusive Ored in Exclusive OR gate 39 with the bit error stream $e_k$ shifted out of shift register 37. The resulting data stream, $d'_k$, is output to the user's data sink 49.

In operation, the card operating software loads the bit-by-bit error file from the hard disk 47 to RAM 46. The operating software then sets up the DMA controllers 41 and 31 to access the error bits stored in RAM 46. When the user's data source 48 produces a clock transition, shift register 37 produces a new error bit which is combined with the user's data through Exclusive OR gate 39. If the error bit is a binary "1", the user's data bit is inverted, representing an error. When shift register 37 no longer contains any valid error bits, the data loading control 38 commands the transfer of error bits from latch 36 to shift register 37. The data loading control 38 then instructs DMA controller 31 to execute a DMA cycle to replace the data in register 36. DMA controller 31, in turn, instructs DMA controller 42 to execute a DMA cycle to replace the data in register 36 with new error bits from RAM 46.

The DMA cycle begins with DMA controller 31 requesting a cycle from DMA controller 43. DMA controller 43 temporarily suspends the operation of CPU 45, and once this is done, DMA controller 43 acknowledges the request from DMA controller 31. DMA controller 31 then generates an address, which is the next sequential address from the one used in the last cycle, and passes it to the RAM 46 through the address latches 32 and 33. The RAM 46 then returns data to the data register 36. If more than one page (128K bytes) of error bits is involved, the channel control 34 requests a channel one cycle from DMA controller 31 to update the most significant address held in latch 33 at the time the page is required to change. The least significant seven address bits in channel one are used as the page address. In this manner, blocks of data of any size up to the capacity of RAM 46 may be transferred without interruption. Once the entire sequence of bit errors has been read out, DMA controller 31 resets itself to transfer the sequence again from the beginning.

The pseudocode for the card operating software is given below. This software links the bit-by-bit error file $e_k$ to the simulator hardware. The error file is loaded into memory (RAM) and then read out to the hardware simulator. Source code in any suitable computer language supported by the host personal computer can be readily written by one of ordinary skill in the data processing arts from this pseudocode.

```
initialize:
    Determine size of Extended RAM
    Setup host DMA system in cascade mode
operate:
    (1) Prompt user for file name of file
        if null filename entered, terminate program
        Open file for reading, determine its size
        From file size, calculate number of pages
            required and number of words per page
    (2) Load up to 32K words from file into buffer
        Transfer buffer to appropriate place in
            Extended RAM
        Repeat until entire file is loaded
    init card:
        Load first address and word count to card
```

-continued

```
DMA controller
  Load first page to card DMA controller, software
     request one cycle to load page latch
  Load page count to card DMA controller
  Put card DMA controller channel 1 in single
     read mode
  Put card DMA controller channel 0 in single
     read mode
Loop to (1)
```

Figure 4:
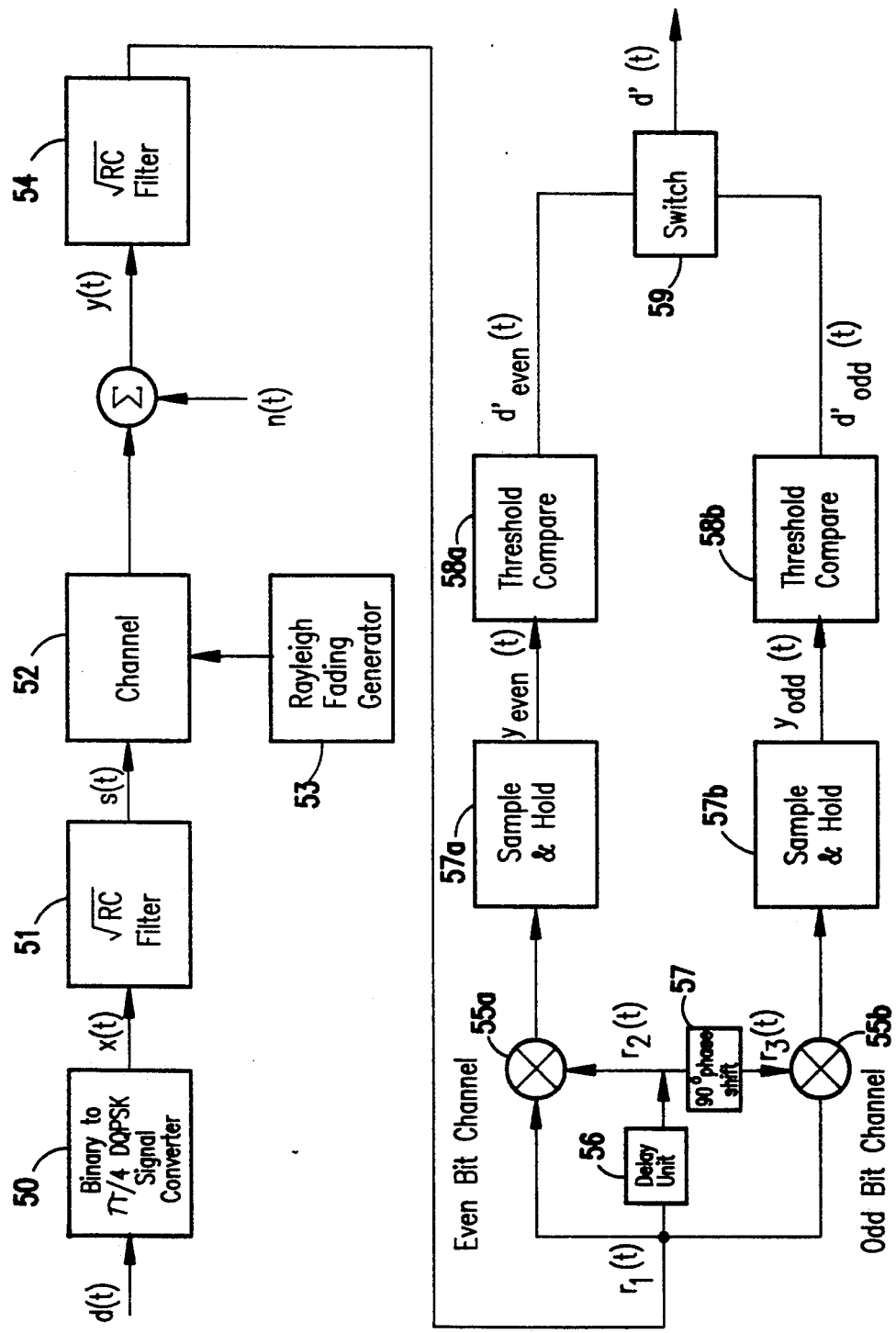
FIG. 4 is a block diagram of a baseband model of a $\pi/4$ DQPSK system.

A block diagram of a $\pi/4$ DQPSK (differential quadrature phase shift keying) model used in the following analysis is shown in FIG. 4. All bandpass signals and channels are represented by low pass complex envelope forms. A pseudorandom binary bit stream, d(t), is sent through the simulator program for BER simulation. The binary bit stream d(t) is stored in computer memory and compared with the received bits d'(t) at the output of the simulated receiver for determination of bit errors. In order to eliminate the need for simulating the high frequency carrier component in bandpass signals in the computer simulation, all bandpass signals and channels are represented by low pass quadrature forms. The number of bits sent can be controlled by the bounded binomial sampling method described by E. L. Crow and M. J. Miles in "A Minimum Cost, Accurate Statistical Method to Measure Bit Error Rates", *Int. Conf. Computer Commun. Rec.* (1976), pp. 631–635, a free run mode is used to ensure a certain number of bits is sent in simulation regardless of the number of errors.

The $\pi/4$ DQPSK system as shown in FIG. 4 comprises a binary to $\pi/4$ DQPSK signal converter 50 which receives an input signal d(t) and provides a modulated output signal x(t). Let $R_l$ be the l th pseudorandom binary number which has equal probability of being a binary "0" or "1". Then, the bit stream d(t) which is assumed to start at time t=0 is given by $$d(t) = \sum_{l=0}^{L-1} R_l \text{rect}\left(\frac{t - lT - \frac{T}{2}}{T}\right), \quad (1)$$

where rect(t) is defined as $$\text{rect}(t) = \begin{cases} 1 & |t| \leq \frac{1}{2} \\ 0 & |t| > \frac{1}{2} \end{cases}, \quad (2)$$

and L is the total number of bits sent through the system for BER analysis. For $\pi/4$ DQPSK, a symbol is formed by examining two consecutive bits, $R_l$ and $R_{l+1}$, in the data bit stream. Each of the four combinations of $R_l$ and $R_{l+1}$ (i.e., 00, 01, 11, 10) represents a specific phase shift, $\phi_n$, with reference to the phase of the previous symbol.

The modulated waveform of the nth symbol represented in baseband I and Q components are given by $$x(t) = \begin{cases} x_c(t) = \sum_{n=0}^{L/2-1} A\cos(\theta_n)\delta(t - nT) & I \text{ channel} \\ x_s(t) = \sum_{n=0}^{L/2-1} A\sin(\theta_n)\delta(t - nT) & Q \text{ channel} \end{cases}, \quad (3)$$

where $\theta_n = \theta_{n-1} + \phi_n$ (4) and $$\phi_n = \begin{cases} \pi/4 & \text{for } R_l = 0 \quad R_{l+1} = 0 \\ 3\pi/4 & \text{for } R_l = 1 \quad R_{l+1} = 0 \\ 5\pi/4 & \text{for } R_l = 1 \quad R_{l+1} = 1 \\ 7\pi/4 & \text{for } R_l = 0 \quad R_{l+1} = 1 \end{cases}, \quad (5)$$

for n=0, 1, ..., L/2−1 and l=0, 1, ..., L−1. $\theta_n$ and $\theta_{n-1}$ are the phases of the nth and (n−1)th symbols.

At initialization, $\theta_{-1} = \pi/4$. x(t) is then sampled for computer simulation at a rate of $T_s = T/N$, where T is the symbol period and N is the number of samples per symbol. x(t) is represented as $$x(t) \approx x(kT_z), \quad (6)$$

where k is a time index and k=0, 1, ..., N−1, ..., (LN)−1

The signal x(t) is filtered in a square root raised cosine filter 51 to produce a signal s(t) that is input to the simulated channel 52. Pulse shaping in the transmitter limits the pulse spectrum while keeping the intersymbol interference to a minimum. Nyquist pulses are pulses satisfying these conditions. By putting a square root raised cosine filter in both the transmitter and the receiver, both a Nyquist pulse and a matched filter are achieved. The transfer function of the square root raised cosine filter is defined as $$H\sqrt{RC}(f) = \begin{cases} 1 & 0 \leq |f| \leq \frac{r_b}{2}(1-\alpha) \\ \cos\left\{\frac{\pi}{2\alpha r_b}\left[|f| - \frac{r_b}{2}(1-\alpha)^2\right]\right\} & \frac{r_b}{2}(1-\alpha) < |f| < \frac{r_b}{2}(1-\alpha) \\ 0 & \frac{r_b}{2}(1+\alpha) < |f| \end{cases}, \quad (7)$$

where $r_b$ is the symbol rate.

By performing the inverse Fourier transform of the transfer function, the impulse response of the square root raised cosine filter in the time domain is obtained. The impulse response was not expressed in a closed form, and in computer simulation, the impulse response is a collection of amplitudes as a function of time, $Kt_s$, stored in a file.

$X(Kt_s)$ is convolved with the impulse response of the square root raised cosine filter and the signal at the output of the filter, $s(Kt_s)$, is sent through the simulated channel. The signal $s(Kt_3)$, is subjected to multiplicative distortion (fading) or frequency-selective fading in the channel depending on the type of simulated channel. White Gaussian noise is added to the signal at the output of the channel although a more recent version is including measurement-based models for impulsive noise, as well. In the simulation, the means signal level is held constant while the added noise power is changed for BER analysis of different signal to noise (S/N) ratio.

A Rayleigh fading generator 53 controls the channel to accurately simulate the intended environment for the equipment. A software fading simulator similar to that described by J. L. Smith, supra, may be used for the Rayleigh fading generator. The preferred embodiment of the invention uses the radio frequency (RF) power spectrum of the fading envelope given by R. H. Clarke in "A Statistical Theory of Mobile-Radio Reception", The Bell Sys. Tech. J., July-Aug. 1968, pp. 957-1000, to simulate the Rayleigh fading spectrum found in mobile radio. Other channel models may also be used.

The output of channel 52 is summed with an additive white Gaussian noise (AWGN) signal, n(t), to produce a resultant signal y(t) to further simulate corruption of the signal by the channel. Other types of noise, such as impulse noise, may also be included. The signal for the nth symbol at the output of the channel with AWGN is represented by $$y(kT_s) = \begin{cases} y_c(kT_s) = s_c(kT_s)*h_b(kT_s) + n_c(kT_s) & I \text{ channel} \\ y_s(kT_s) = s_s(kT_s)*h_b(kT_s) + n_s(kT_s) & Q \text{ channel} \end{cases} \quad (8)$$

where * is the convolution operation, and $k=nN, Nn+1, \ldots, Nn+N-1$. The resultant signal is filtered in a matched filter 54 at the receiver to produce a signal $r_1(t)$. The matched filter 54 in the receiver is a square root raised cosine filter and has the same transfer function as equation (7). In a flat and AWGN channel, the output of this matched filter 54 is Nyquist pulses with no intersymbol interference and with the S/N ratio maximized. However, in a frequency-selective fading channel, the signal in the channel is distorted and pulse spreading occurs.

At the output of the matched filter 54, for the nth symbol, $$r_1(kT_s) = \begin{cases} r_c(kT_s) & I \text{ channel} \\ r_s(kT_s) & Q \text{ channel} \end{cases} \quad (9)$$

where $k=(n-1)N, (n-1)N+1, \ldots, (n-1)N+N-1$, $r_c(Kt_s)$ is the result of the convolution between $y_c(kT_s)$ and the impulse response of the square root raised cosine filter, and $r_s(kT_s)$ are the results of the convolution of $Y_s(kT_s)$, and the impulse response. Note that imperfect filters, for example, filters with nonlinear phase characteristics or passband ripple, could be used in the hardware simulator.

The receiver has an even bit channel and an odd bit channel. The two channels are essentially identical but operate in quadrature phase. More specifically, the signal $r_1(t)$ is supplied to two multipliers 55a and 55b and to a delay unit 56. At the output of the delay unit 56, $$r_2(kT_s) = \begin{cases} r_{c2}(kT_s) & I \text{ channel} \\ r_{s2}(kT_s) & Q \text{ channel} \end{cases} \quad (10)$$

where $r_{c2}(Kt_s)$ and $r_{s2}(kT_s)$ are the output of the matched filter 54 of the previous symbol in the I and Q channel, respectively. The output of the delay unit 56 is applied directly to multiplier 55a and via a 90° phase shift 57 to multiplier 55b.

At the output of the phase shift 57, $$r_3(kT_s) = \begin{cases} -r_{s2}(kT_s) & I \text{ channel} \\ r_{c2}(kT_s) & Q \text{ channel} \end{cases} \quad (11)$$

Therefore, the signal at the output of multiplier a 55a is represented by $$y_{even}(kT_S) = r_c(kT_S)r_{c2}(kT_S) + r_s(kT_S)r_{s2}(kT_S). \quad (12)$$

The signal at the output of the multiplier 55b is represented by $$y_{odd}(kT_S) = -r_c(kT_S)r_{s2}(kT_S) + r_s(kT_S)r_{c2}(kT_S). \quad (13)$$

The outputs of multipliers 55a and 55b are applied to respective sample and hold circuits 57a and 57b where they are sampled at time index $k=nN+N-1$. The output signals $y_{even}(t)$ and $y_{odd}(t)$ are input to respective threshold compare circuits 58a and 58b where they are compared with a threshold which is set at zero to determine the binary state of the l th and the (l+1)th bits in the even and odd bit channels, respectively. The outputs of these circuits are signals $d'_{even}(t)$ and $d'_{odd}(t)$, respectively, which are input to a switch 59. The output bit stream d'(t) is then obtained by taking the alternate bits from the even channel and the odd channel (i.e., l th bit from the even channel and (l+1)th bit from the odd channel). In other words, $$d'(t) = \sum_{l=0}^{L-1} R_l \text{rect}\left(\frac{t - lT - \frac{T}{2}}{T}\right), \quad (14)$$

where $$R_l = \begin{cases} 1 & y_{even,\,odd}(kT_s) > \text{Threshold} \\ 0 & y_{even,\,odd}(kT_s) \leq \text{Threshold} \end{cases} \quad (15)$$

where $k=l N+N-1$. Finally, '(t) is compared with the original bit stream d(t) to determine the number of bit errors.

Three types of channels are used for BER analysis. One is the additive white Gaussian noise (AWGN) channel, a second is the Rayleigh flat fading channel, and the third is the frequency-selective fading channel. Additional channels, based on measurements, are being added presently Both the flat fading channel and the frequency-selective fading channel are generated by computer simulation routine.

For the AWGN channel, no fading or pulse spreading occurs in the transmitted signal. Only white Gaussian noise n(t) with power spectral density of $N_o/2$ is added to the signal after passing through the channel. The baseband equivalent impulse response of the channel is a simple delta function, $$h_b(t) = \delta(t).$$

By convolving the pulse shaped signal s(t) with the channel $h_b(t)$, the output signal y(t) with AWGN n(t) is given by $$y(kT_s) = s(kT_s) + n(kT_s), \quad (17)$$

where $n(kT_S)$ are the noise samples added to each signal sample. $n(kT_S)$ are independent for all k and are Gaussian identically distributed $N(0, \sigma_i^2)$ with zero mean and variance $\sigma_i^2$.

For the Rayleigh fading channel, the transmitted signal in the channel is subjected to multiplicative distortion of a factor $\alpha$, where $\alpha$ is Rayleigh distributed. AWGN n(t) is also added to the signal after the signal is passed through the channel. Impulse noise could also be added at this point. The output signal is expressed as $$y(kT_S) = \alpha s(kT_S) + n(kT_S). \quad (18)$$

A two ray independent Rayleigh distributed delay profile is used to model a frequency-selective fading channel. P. A. Bello and B. D. Nelin in "the Effect of Frequency Selective Fading on the Binary Error Probabilities of Incoherent and Differentially coherent Matched Filter Receivers", *IEEE Trans. Commun.*, June 1963 pp. 170–186, show that the irreducible BER is generally dependent on the ratio of root mean square (rms) delay spread to symbol period and not on the distribution of the delay profile; therefore, a two ray model is a good simple frequency-selective fading channel model for BER analysis. It will be understood, however, that other models can be used. The impulse response of the channel is expressed as $$h(kT_S) = \alpha_1 \delta(kT_S) + \alpha_2 \delta(kT_S - t_d), \quad (19)$$

where $\alpha_1$ and $\alpha_2$, are independent Raleigh distributed, and $t_d$ is the time delay between the two rays and is determined for a given rms delay spread as follows:

The rms delay spread $\tau$ is defined by D. C. Cox in "910 MHz Urban Mobile Radio Propagation: Multipath Characteristics in New York City", IEEE Trans. Commun., vol. COM-21, no. 11, Nov. 1973, pp. 1188–1193, as $$\tau = \sqrt{\frac{\sum_{k=1}^{M} (\tau_k - D)^2 P(\tau_k)}{\sum_{k=1}^{M} P(\tau_k)}}, \quad (20)$$

where D is the average delay and is calculated by $$D = \frac{\sum_{k=1}^{M} \tau_k P(\tau_k)}{\sum_{k=1}^{M} P(\tau_k)}, \quad (21)$$

and $P(\tau_k)$ is the average power at a fixed delay $\tau_k$ for a set of N consecutive power delay profiles; i.e., $$P(\tau_k) = \frac{1}{N} \sum_{i=0}^{N} P_i(\tau_k). \quad (22)$$

In the simulation of the two ray model, equations (20) and (21) can be simplified as follows:

$$\tau = \sqrt{\frac{(\tau_1 - D)^2 P(\tau_1) + (\tau_2 - D)^2 P(\tau_1)}{P(\tau_1) + P(\tau_2)}}, \quad (23)$$

and $$D = \frac{\tau_1 P(\tau_1) + \tau_2 P(\tau_2)}{P(\tau_1) + P(\tau_2)}, \quad (24)$$

where $\tau_1$ denotes the first ray and $\tau_2$ denotes the second ray in the two ray model.

Since $P(\tau_1)$ is the average power at a fixed delay $\tau_k$, then $P(\tau_1)$ and $P(\tau_2)$ can be expressed as $$P(\tau_1) = E\{\alpha_1^2\}, \text{ and} \quad (25)$$

$$P(\tau_2) = E\{\alpha_2^2\}. \quad 26)$$

Furthermore, both $E\{\alpha_1^2\}$ and $E\{\alpha_2^2\}$ are set to unit in the simulation, $\tau_1$ is set to zero, and $\tau_2$ is set to $\tau_k$. Therefore, from equations (23) and (24), the delay between the two rays for a specified rms delay spread can be found as $$\tau_k = 2\tau. \quad (27)$$

Using equation (27), a two ray model can be formed with a given rms delay spread $\tau$. The signal at the output of the channel is then $$y(kT_S) = s(kT_S) * h(kT_S) + n(kT_S). \quad (28)$$

Figure 5:
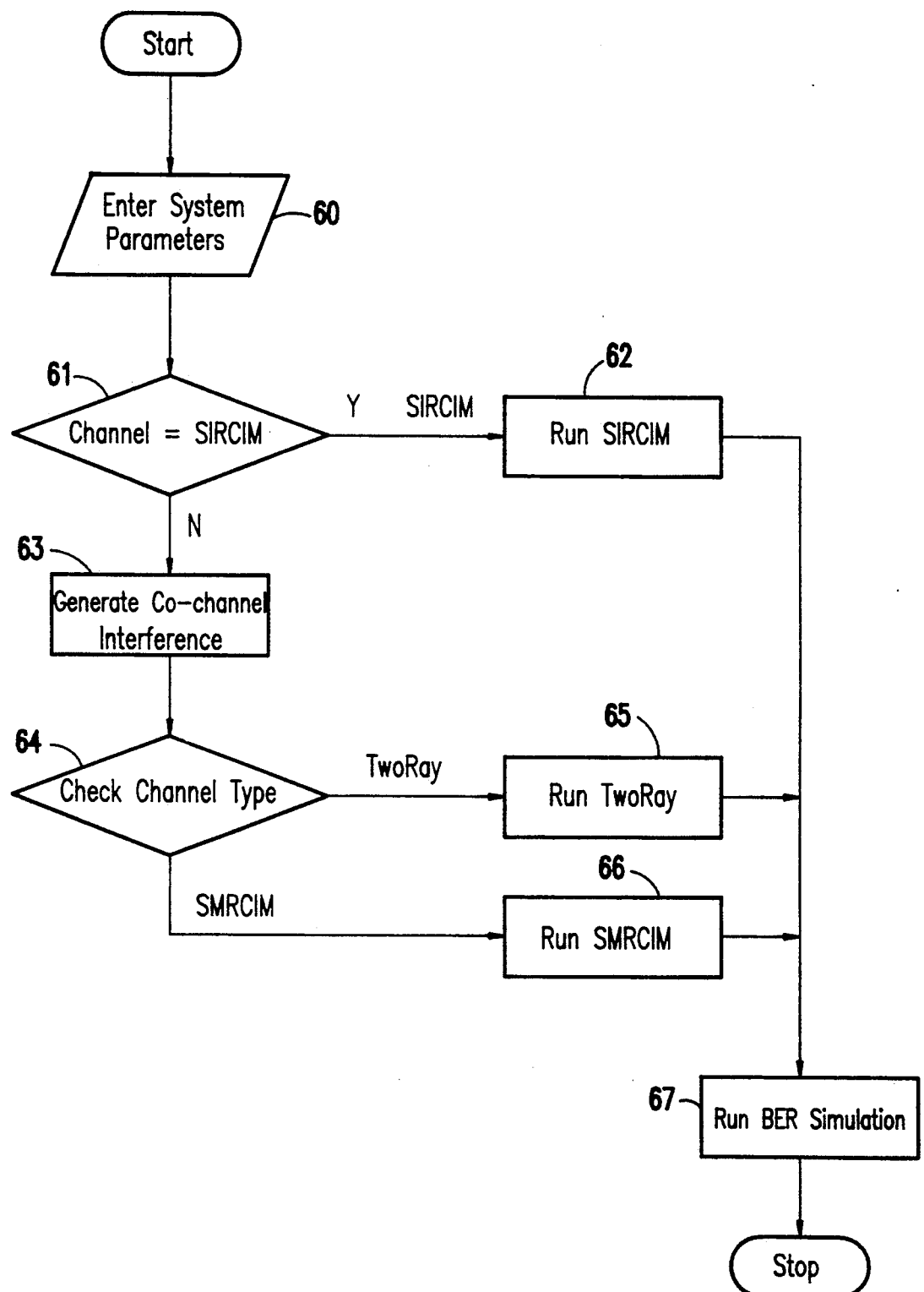
FIG. 5 is a flow diagram showing the logic of simulation software run on the personal computer shown in FIG. 2.

FIG. 5 is a flow diagram of the logic of the main module of the computer program for the bit error rate simulator (BERSIM) according to the invention. The program can be written in any computer language of choice by a computer programmer of ordinary skill in the art. The computer language need only be one that is supported by the computer used. Examples include Pascal, BASIC and C.

The process starts in function block 60 where the user is prompted to enter system parameters. These include the type of modulation, such as DQPSK, BPSK (binary phase shift keying), spread spectrum BPSK FSK (frequency shift keying), or GMSK (Gaussian minimum shift keying), data rate, roll off factor for filters, channel type and the like. The channel types supported in the illustrated example are SIRCIM, TwoRay and SMRCIM. SIRCIM, for Simulation of Indoor Radio Channel Impulse response Models, is a measurement-based indoor propagation channel model described by T. S. Rappaport, S. Y. Seidel and F. Takamizam, supra. SIRCIM is a commercially available product through Virginia Tech Intellectual Properties (VTIP), Inc., of Blacksburg, Va. TwoRay is an outdoor channel model based on W. C. Jakes, *Microwave Mobile Communications*, John Wiley & Sons (1974), and J. L. Smith, supra. SMRCIM, for Simulation of Mobile Radio Channel Impulse response Models, is an outdoor propagation model based on SIRCIM and measured data collected by Virginia Polytechnic Institute and State University's Mobile and Portable Radio Research Group.

If the channel is SIRCIM as determined in decision block 61, the process calls a routine called SIRCIM in function block 62. If the channel is not SIRCIM, the channel is an outdoor channel, and therefore a routine is called in function block 63 to generate co-channel interference. The channel type is checked in decision block 64 t determine if the channel type is TwoRay. If so, the process calls a TwoRay channel generator routine in function block 65; otherwise, the channel is SMRCIM, and the process calls a routine called SMRCIM in function block 66. The output of the called channel simulation routine is the channel impulse response, which is stored in an external file. The impulse response data is then available for use in running the bit error rate (BER) simulation in function block 67.

Figure 6A:
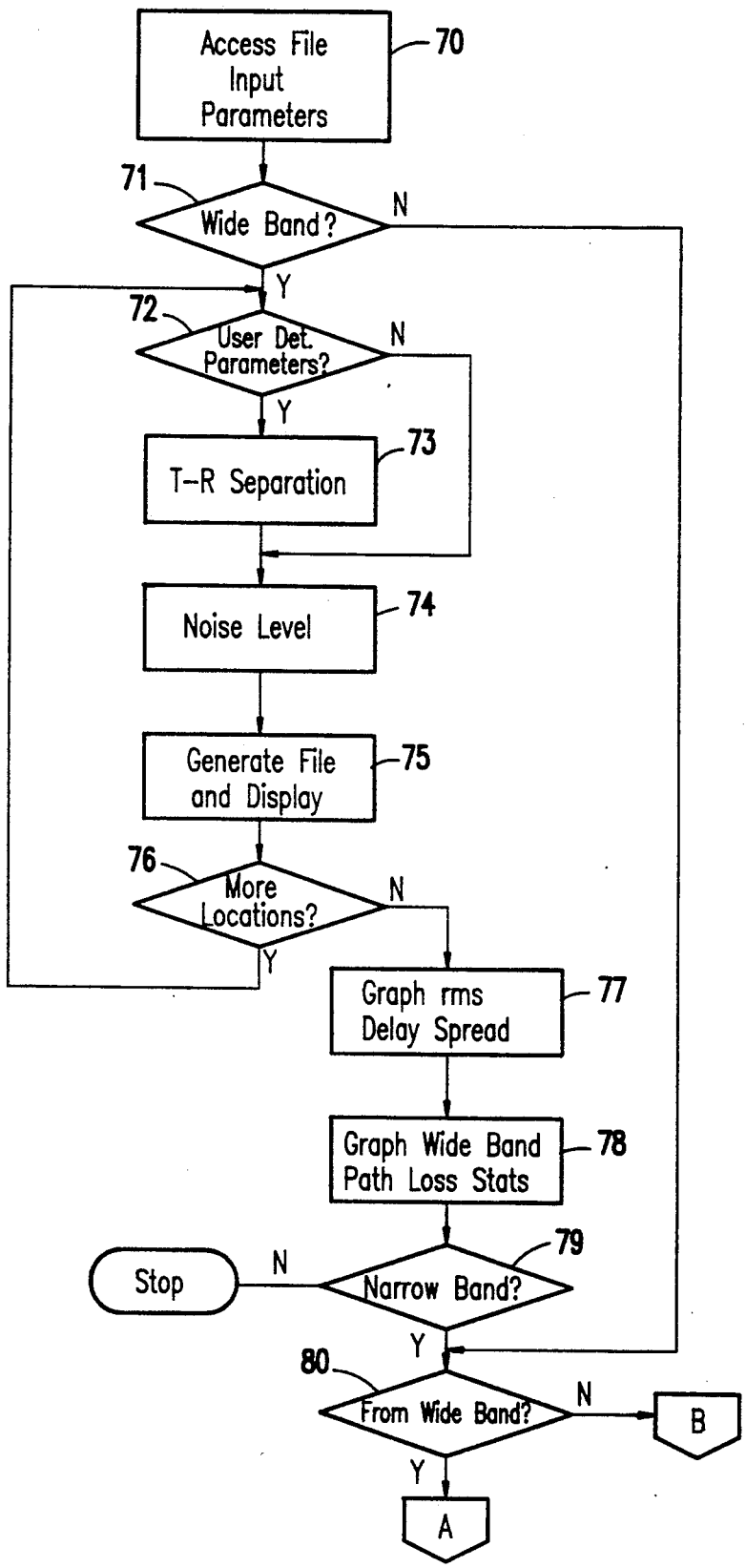
FIGS. 6A, 6B and 6C, taken together, are a flow diagram of the SIRCIM channel routine called by the process shown in FIG. 5.
Figure 6B:
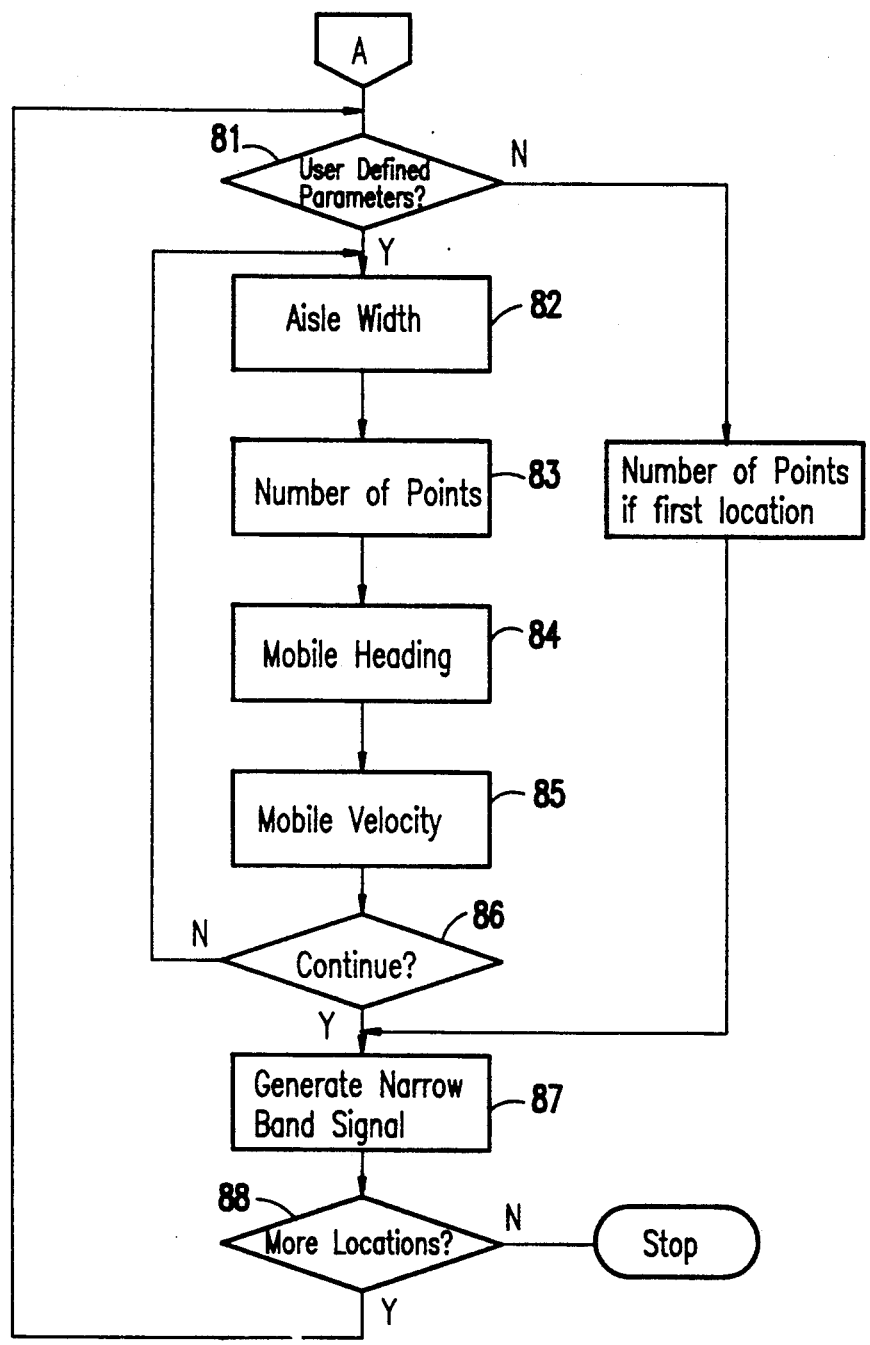
Figure 6C:
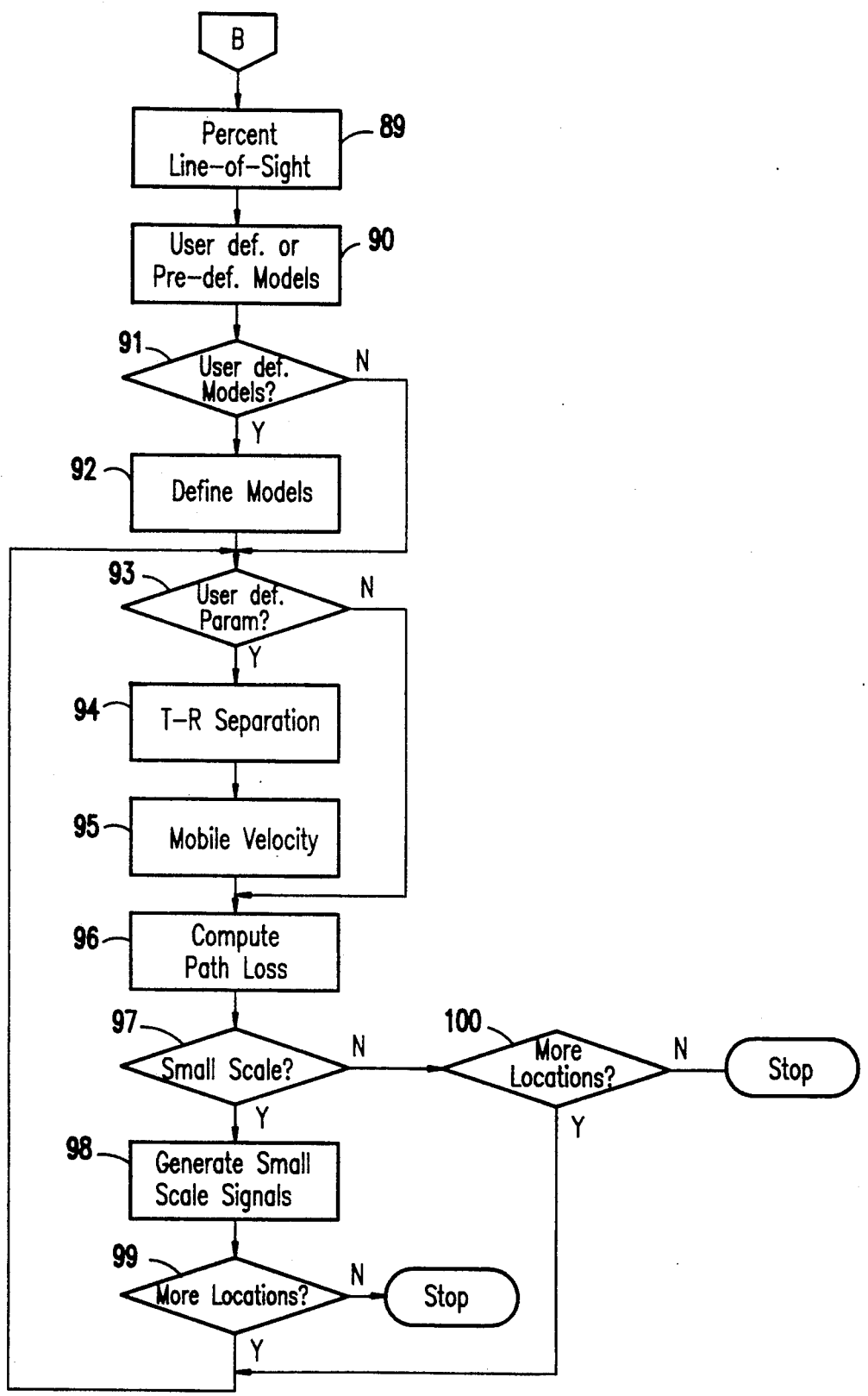

The logic of SIRCIM channel routine called in function block 62 is shown in the flow diagram of FIGS. 6A to 6C, to which reference is now made. These figures are simplified flow diagrams of the SIRCIM routine, and more detail may be had by reference to the user's manual for the SIRCIM product as published Oct. 19, 1990.

The flow diagram shown in FIG. 6A illustrates the logic for the input of general simulation parameters and the simulation of wide band impulse responses. The process begins by accessing an external file by filename in function block 70. From the file, the number of locations within a building, the building type and the simulation type are extracted. A determination is next made in decision block 71 as to whether the simulation is wide band, and if so, a further determination is made in decision block 72 as to whether user defined parameters are to be input. If so, transmitter and receiver separation is input in function block 73. In either case, the noise level is input in function block 74, and the file is generated and displayed in function block 75. A test is next made in decision block 76 to determine if there are more parameters to be processed. If so, the process loops back to decision block 72; otherwise, the wide band simulation complete and the output is generated. The output is in the form of a graph of rms (root mean squared) delay spread in function block 77 and a graph of the wide band path loss statistics in function block 78.

When the wide band simulation is complete a test is next made in decision block 79 to determine if a narrow band simulation is to be performed. If not, the process ends. If a narrow band simulation is to be performed as determined in either decision block 71 or decision block 79, a test is next made in decision block 80 as to whether the narrow band simulation is to be made from the wide band impulse response. If so, the process goes to the flow diagram shown in FIG. 6B; otherwise, the process goes to the flow diagram of FIG. 6C.

Referring first to FIG. 6C, a test is made in decision block 81 to determine if user defined parameters are to be input. If so, the user is prompted to input parameters such as aisle width, number of points, mobile heading and mobile velocity in function blocks 82 to 85. A test is made in decision block 86 to determine if the user has completed the input of parameters. If not, the process loops back to function block 82; otherwise, the process continues at decision block 87. If user defined parameters are not to be input, as determined in function block 81, then the process goes directly to function block 87.

In function block 87, the narrow and signal is generated using the wide band impulse response previously generated. Then, in decision block 88, a test is made to determine if there are more locations to be simulated. If so the process loops back to decision block 81; otherwise, the output for the narrow band simulation is generated, and the process ends.

Referring next to FIG. 6B, the logic for the narrow band simulation not using the wide band impulse response is shown. The process begins in function blocks 89 and 90 where the user is prompted to input percent line-of-sight and model definitions, respectively. If user defined models are to be used as determined in decision block 91, those models are defined in function block 92. If user defined parameters are to be input as determined by decision block 93, then the user is prompted to input parameters such as transmitter and receiver separation and mobile velocity in function blocks 94 and 95, respectively. Next, the path loss is computed in function block 96, and a test is made in decision block 97 to determine if the simulation is small scale. If so, small scale signals are generated in function block 98, and test is made in decision block 99 to determine if more locations are to be simulated. If so, the process loops back to decision block 93; otherwise, the output for the simulation is generated and the process ends. If not small scale as determined in decision block 97, a test is made in decision block 100 to determine if more locations are to be simulated. If so, the process loops back to decision block 93; otherwise, the output for the simulation is generated and the process ends.

Figure 7:
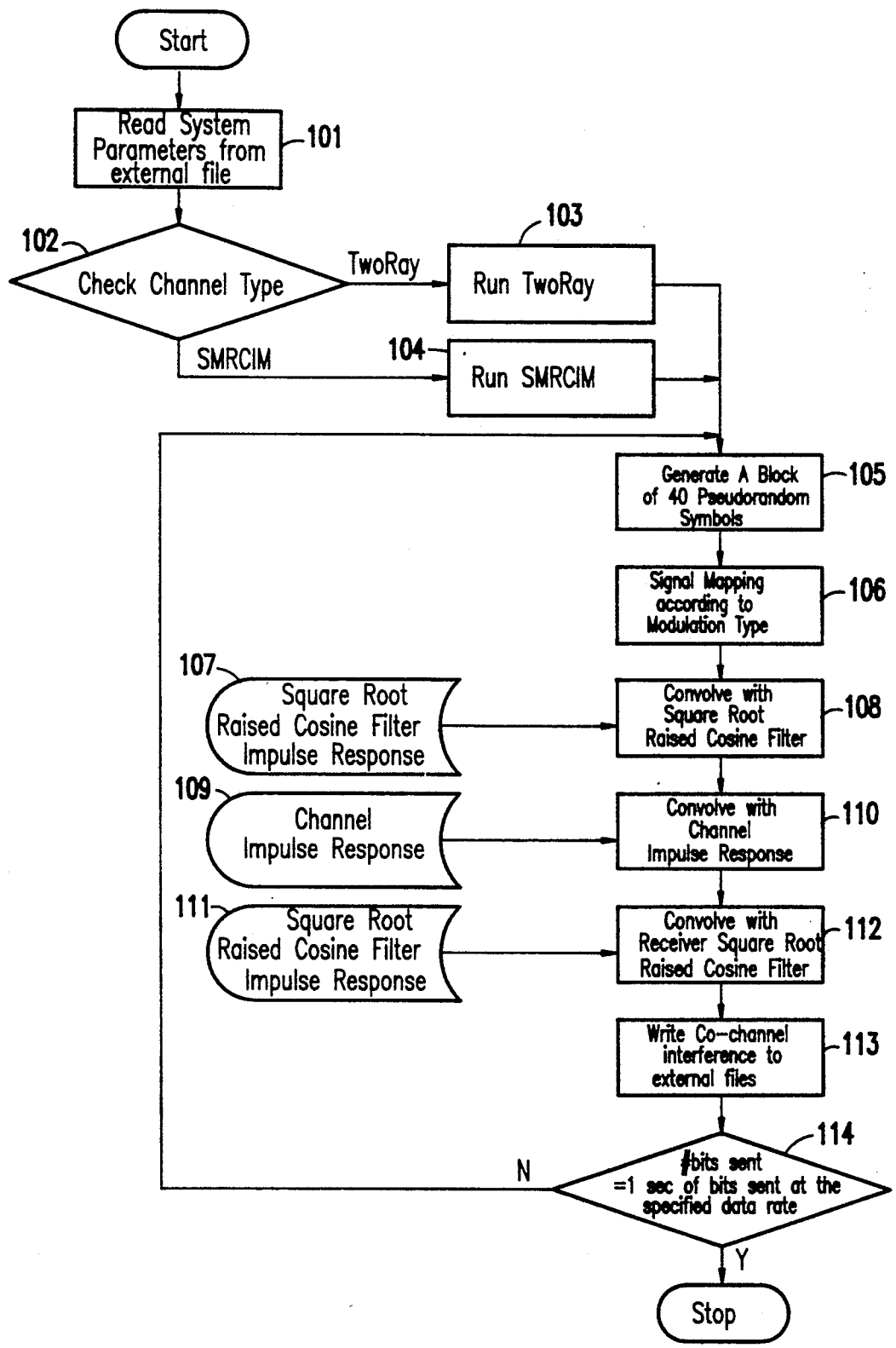
FIG. 7 is a flow diagram of the co-channel interference routine called by the process shown in FIG. 5.

The logic of the co-channel interference routine called in function block 63 is shown in the flow diagram of FIG. 7, to which reference is now made. The process begins reading system parameters from an external file in function block 101. A check is then made in decision block 102 to determine the channel type. If TwoRay, the TwoRay simulation is run in function block 103; otherwise, the SMRCIM simulation is run in function block 104. In either case, a block of forty pseudorandom symbols is generated in function block 105. Then, in function block 106, signal mapping is performed according to modulation type. A data file 107 for a square root raised cosine filter impulse response is called, and the impulse response is convolved with the output of function block 106 in function block 108. A data file 109 for the channel impulse response is called, and the impulse response is convolved with the output of function block 108 in function block 110. Next, a data file 111 for a square root raised cosine filter impulse response is called, and the impulse response is convolved with the output of function block 110 in function block 112. The resulting co-channel interference is written to an external file in function block 112, and a test is made in decision block 114 to determine if the number of bits equal one second of bits sent at the specified data rate. If not, the process loops back to function block 105; otherwise, the process stops.

Figure 8:
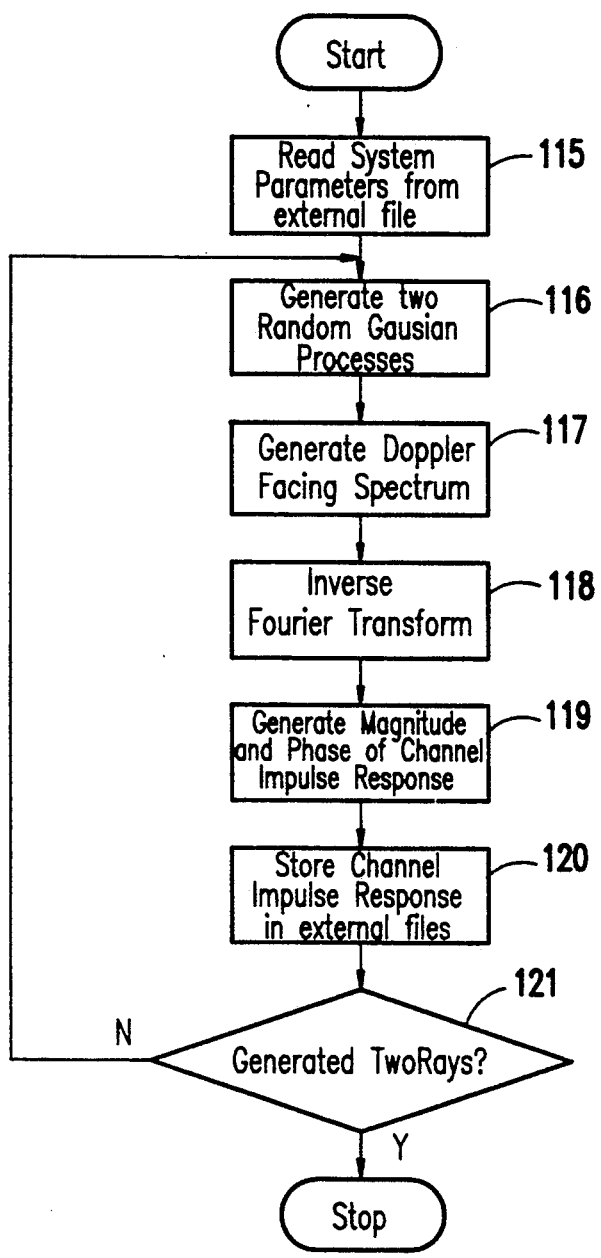
FIG. 8 is a flow diagram of the TwoRay routine called by the process shown in FIG. 5.

The logic of the TwoRay channel routine called in function block 65 of FIG. 5 is shown in the flow diagram of FIG. 8, to which reference is now made. The process begins by reading system parameters from an external file in function block 115. Two random Gaussian processes are generated in function block 116, and the Doppler fading spectrum is generated in function block 117. The inverse Fourier transform of this output of function block 117 is computed in function block 118, and based on the inverse Fourier transform, the magnitude and phase of the channel impulse response is generated in function block 119. The channel impulse response is then stored in an external file in function block 120. A test is made in decision block 121 to determine if two rays have been generated. If not, the process loops back to function block 116 to generate the second ray; otherwise, the process stops.

The logic of the SMRCIM routine called in function block 66 of FIG. 5 is similar to that the SIRCIM routine shown in FIG. 6, modified for an outdoor channel application.

Figure 9A:
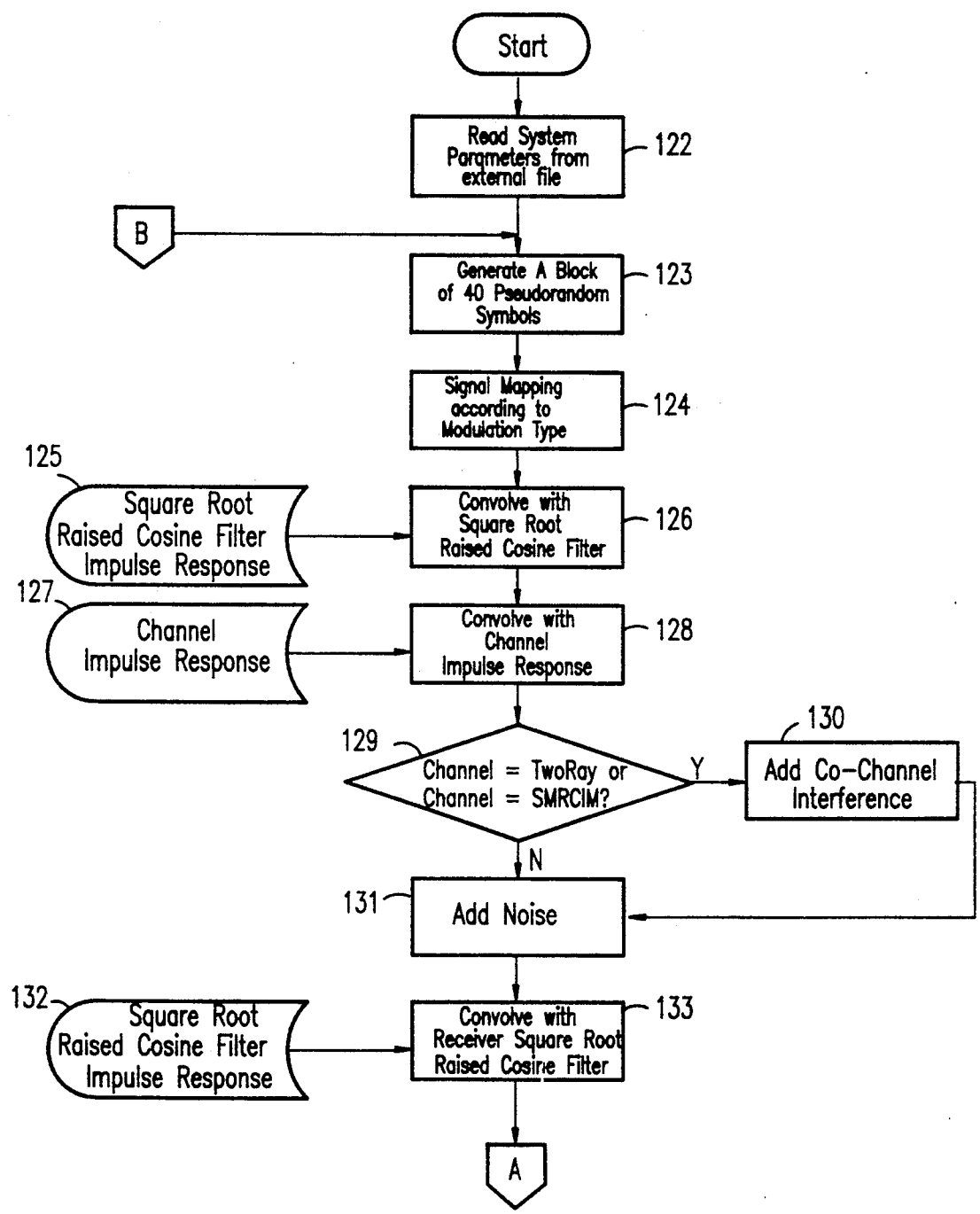
FIGS. 9A and 9B, taken together, are a flow diagram of the BER simulation routine called by the process shown in FIG. 5.
Figure 9B:
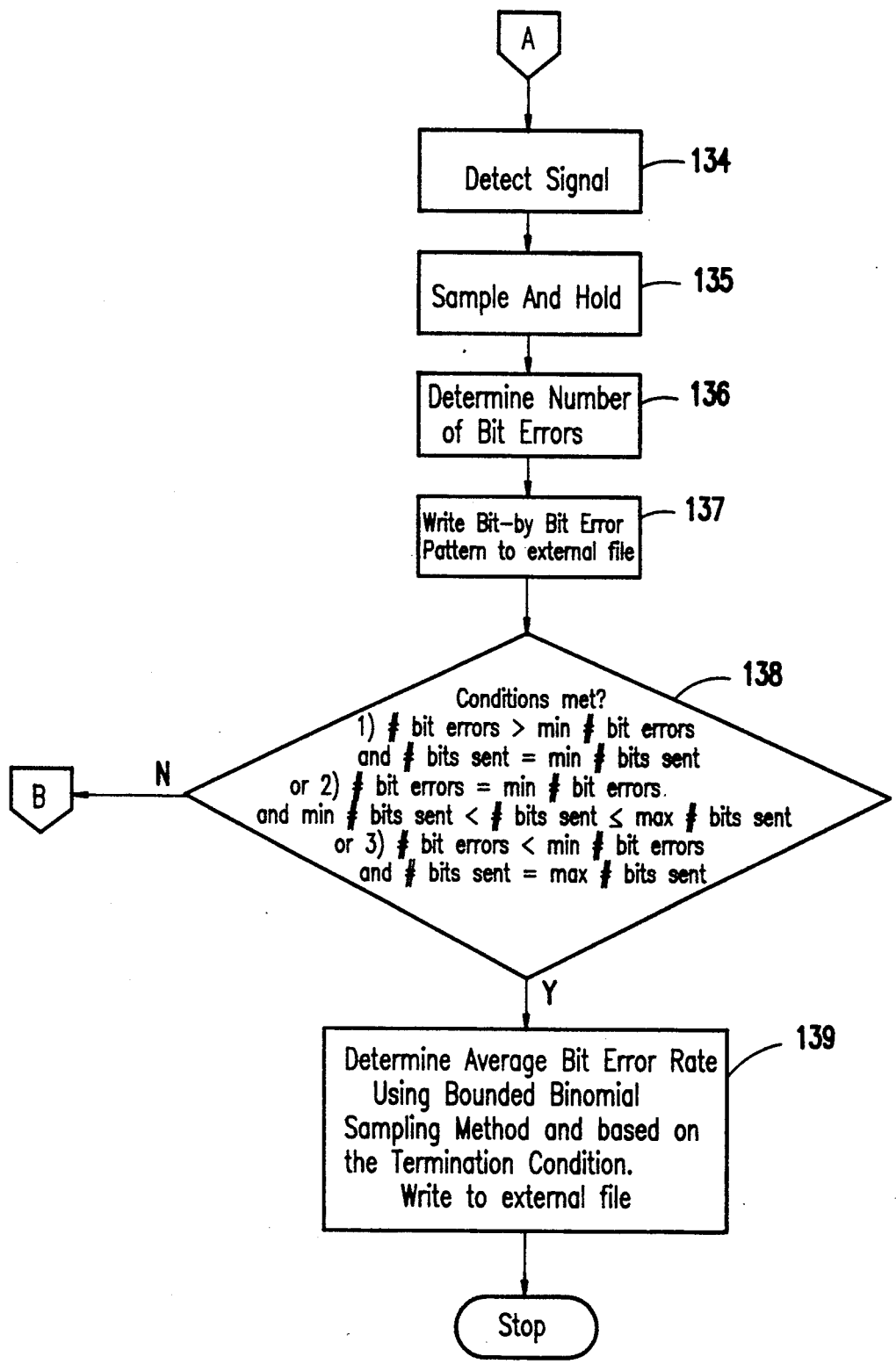

Once the impulse response of the channel has been generated and stored, the channel can be simulated for a data stream. FIGS. 9A and 9B, taken together, are a flow diagram of the BER simulation called in function block 67 in FIG. 5. The data stream may be either pseudorandom or a user supplied data stream for hardware to be designed. Referring first to FIG. 9A, the system parameters are read from the external file in function block 122. A block of forty pseudorandom symbols is generated in function block 123, and signal mapping according to modulation type is performed in function block 124. A data file 125 for a square root raised cosine filter impulse response is accessed, and the impulse response is convolved with the output of function block 124 in function block 126. A data file 127 for the channel impulse response is accessed, and the impulse response is convolved with the output of function block 126 in function block 128. A test is then made in decision block 129 to determine if a TwoRay or SMRCIM channel. If so, the co-channel interference generated by the routine shown in FIG. 7 is added in function block 130. In either case, noise is next added in function block 131. Then, a data file 132 for a square root raised cosine filter impulse response is accessed, and the impulse response is convolved with the output of function block 131 in function block 133. The process then goes to FIG. 9B, to which reference is now made.

In FIG. 9B, the signal is detected in function block 134, and the detected signal is sampled and temporarily stored in a sample and hold circuit in function block 135. The stored value is used to determine the number of bit errors in function block 136, and the bit-by-bit error pattern is written to an external file in function block 137. Then, in decision block 138, a series of tests are made to determine if one of three conditions governed by the bounded binomial sampling method is met. These conditions are whether 1) the number of bit errors is greater than or equal to the minimum number of bit errors and the number of bits sent equals the minimum number of bits sent, 2) the number of bit errors equals the minimum number of bit errors and the number of bits sent is greater than the minimum n bits sent and less than or equal to the number of bits sent, or 3) the number of bit errors is less than the minimum number of bit errors and the number of bits sent is greater than or equal to the number of bits sent. If none of those three conditions are met, the process loops back to function block 123 in FIG. 9A; otherwise, the average bit error rate is determined in function block 139 using the bounded binomial sampling method. Alternatively, the bounded binomial sampling method may be defeated. The bit error rate (BER) is written to an external file before the process ends.

Figure 11:
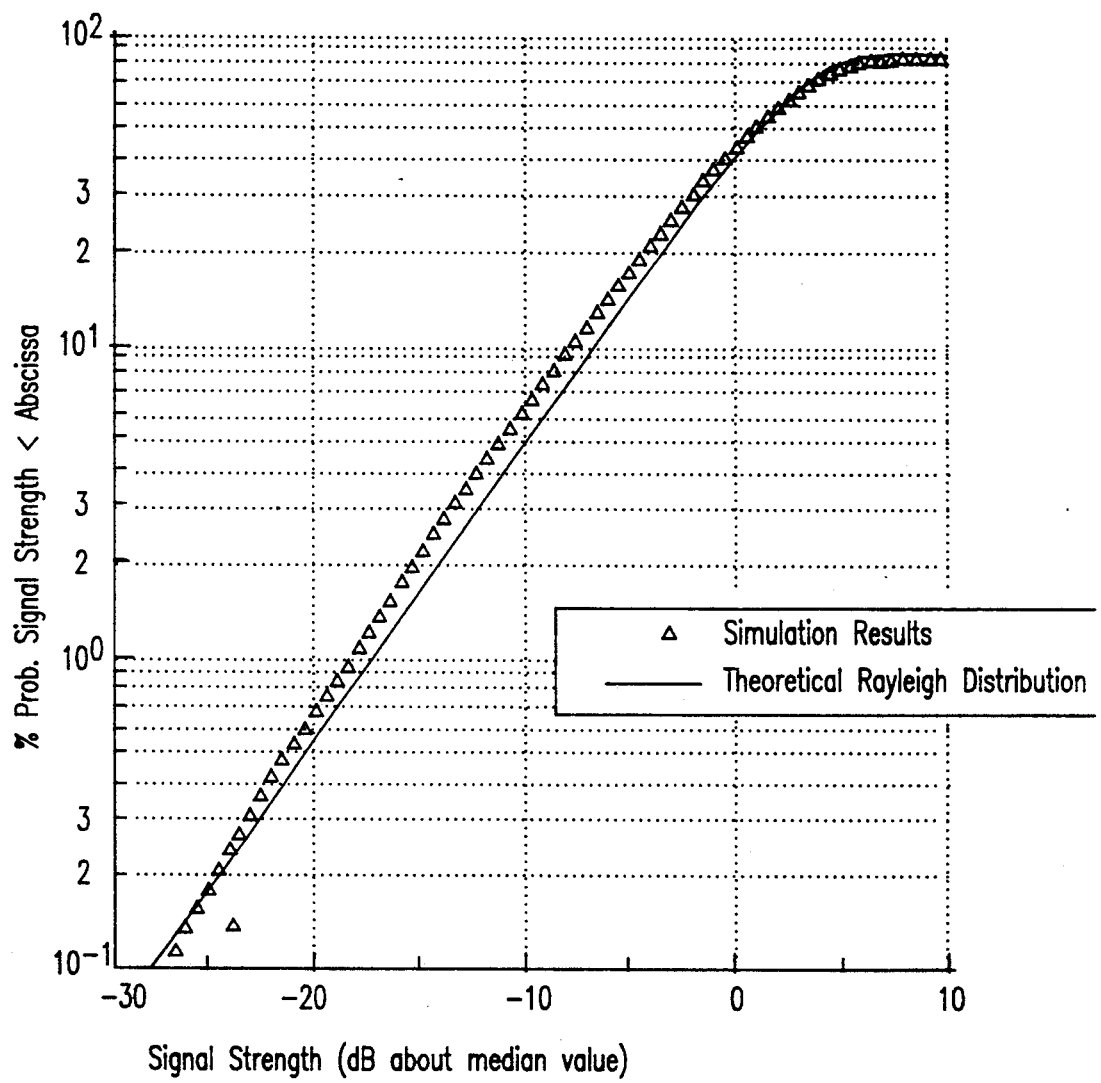
FIG. 11 is a graph showing cumulative distribution of simulated Rayleigh fading about a median value.
Figure 12:
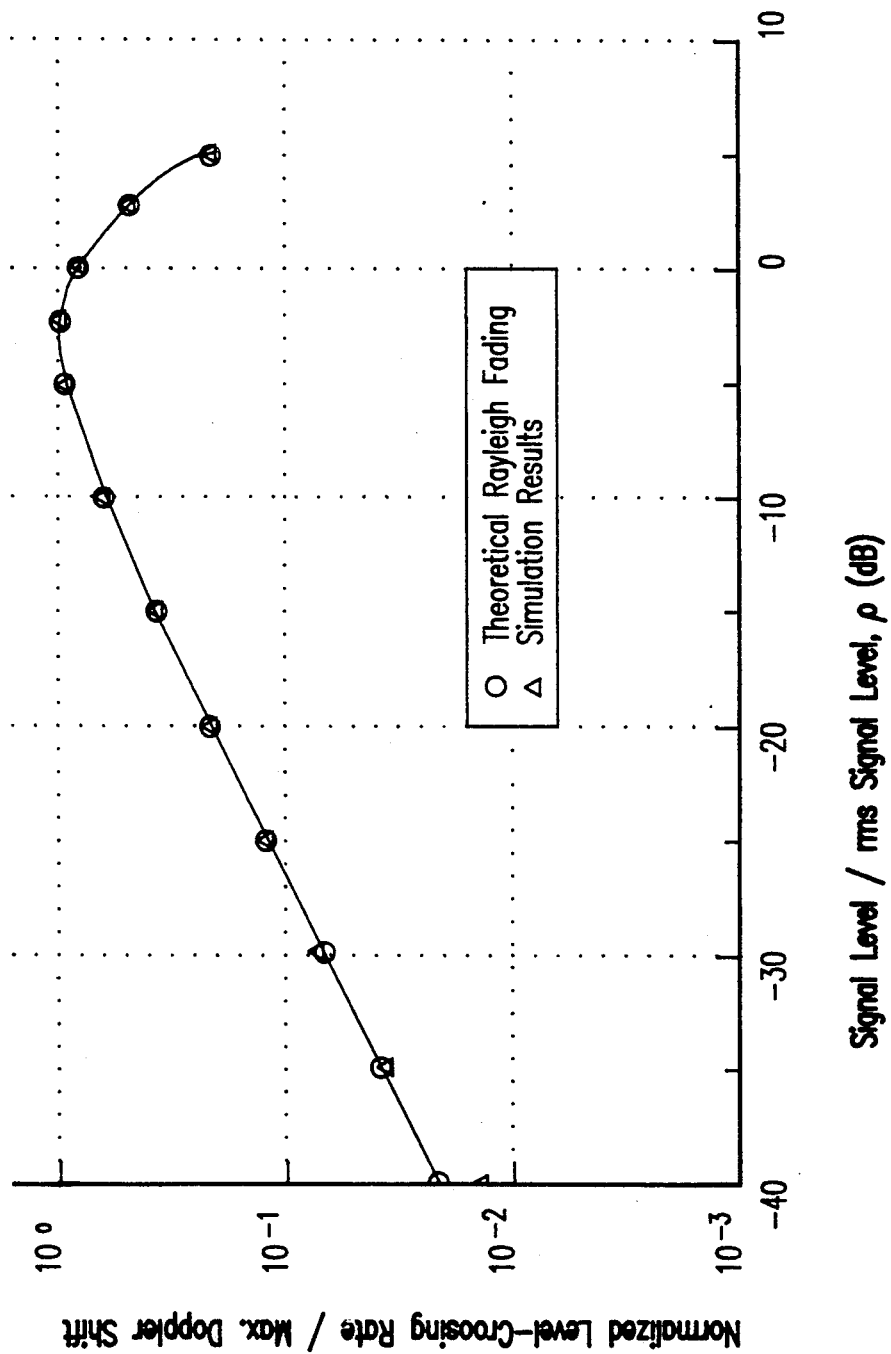
FIG. 12 is a graph showing normalized level crossing rate simulated Rayleigh fading along with theoretical results.

A typical fading envelope generated by the simulation routine with the maximum Doppler frequency of 76 Hz (v=100 km/hr, $\lambda=0.35$) is shown in FIG. 10. As can be seen in FIG. 10, fast fading is found over distance of about half a wavelength which agrees with the observation found in real mobile channels. FIG. 11 shows the cumulative probability distributions about median for sixty Rayleigh fading envelopes generated by the simulation software. A theoretical Rayleigh distribution curve is also shown in FIG. 11 for comparison. It can be seen that the simulation results show excellent agreement with the theoretical results and the simulated envelopes are within 1 dB of the theoretical Rayleigh curve down to −30 dB below median value. The normalized level crossing rate as given by W. C. Jakes, supra, for the sixty fading envelopes are compared with the theoretical result in FIG. 12. Again, the simulation results fit well with the theoretical results and the maximum level crossing rate in both results are found at the same level, $\rho = -3$ dB. The performances of the Rayleigh fading simulation routine have shown to agree very well with theoretical results which indicate that it is a useful tool for modeling a mobile channel.

Figure 13:
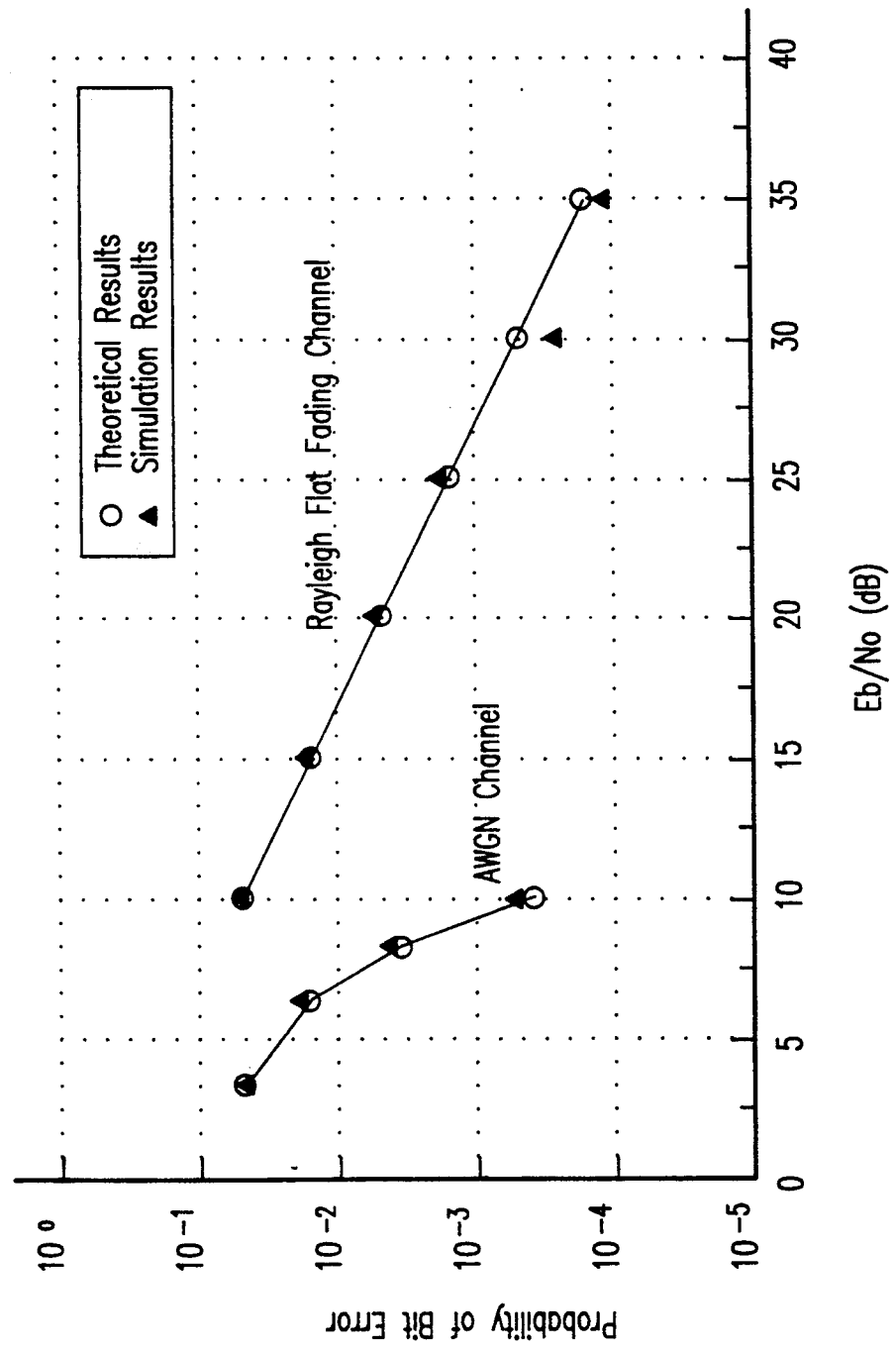
FIG. 13 is a graph showing comparisons of simulated BER performances with theoretical results for $\pi/4$ DQPSK in AWGN and Rayleigh flat fading channels.

FIG. 13 shows the BER simulation results for $\pi/4$ DQPSK in the AWGN channel. Corresponding theoretical results are also shown in FIG. 13 for comparison. As can be seen, the simulation results match well with the corresponding theoretical results in the AWGN channel. FIG. 13 also shows the BER simulation results of $\pi/4$ DQPSK in a Rayleigh flat fading channel. The Rayleigh flat fading channel is generated by the Rayleigh fading simulation routine. The theoretical BER result provide by J. G. Proakis in *Digital Communications*, McGraw-Hill (1983), is shown in FIG. 13 for comparison. Again, the simulation results show good comparison with the theoretical results.

One of the important features of the invention is that, since a highly accurate channel model is used to predict small scale fading, it is possible to distinguish the precise time of occurrence of bit errors. Furthermore, when used in conjunction with the hardware baseband simulator shown in FIG. 3, it becomes possible to conduct performance evaluations of baseband data sources in a laboratory, while maintaining full control of physical parameters such as mobile velocity, data rate, filtering techniques, and error control coding in the simulation software. In other words, it becomes possible to evaluate the performance of various baseband platforms using a wide range of equalization, coding or diversity approaches before implementing such capabilities in an actual prototype.

Figure 14:
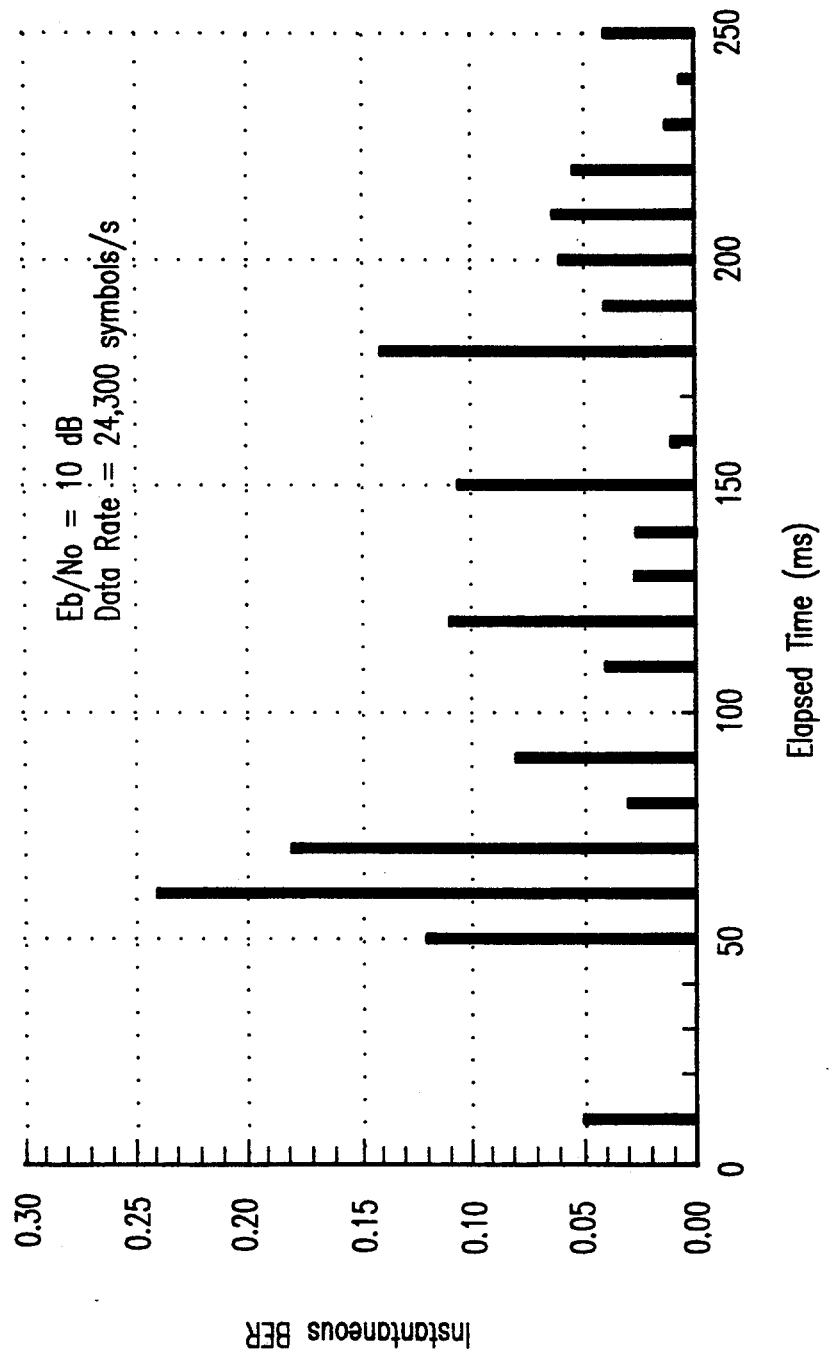
FIG. 14 is a graph showing instantaneous BER for $\pi/4$ DQPSK in a Rayleigh flat fading channel.
Figure 15:
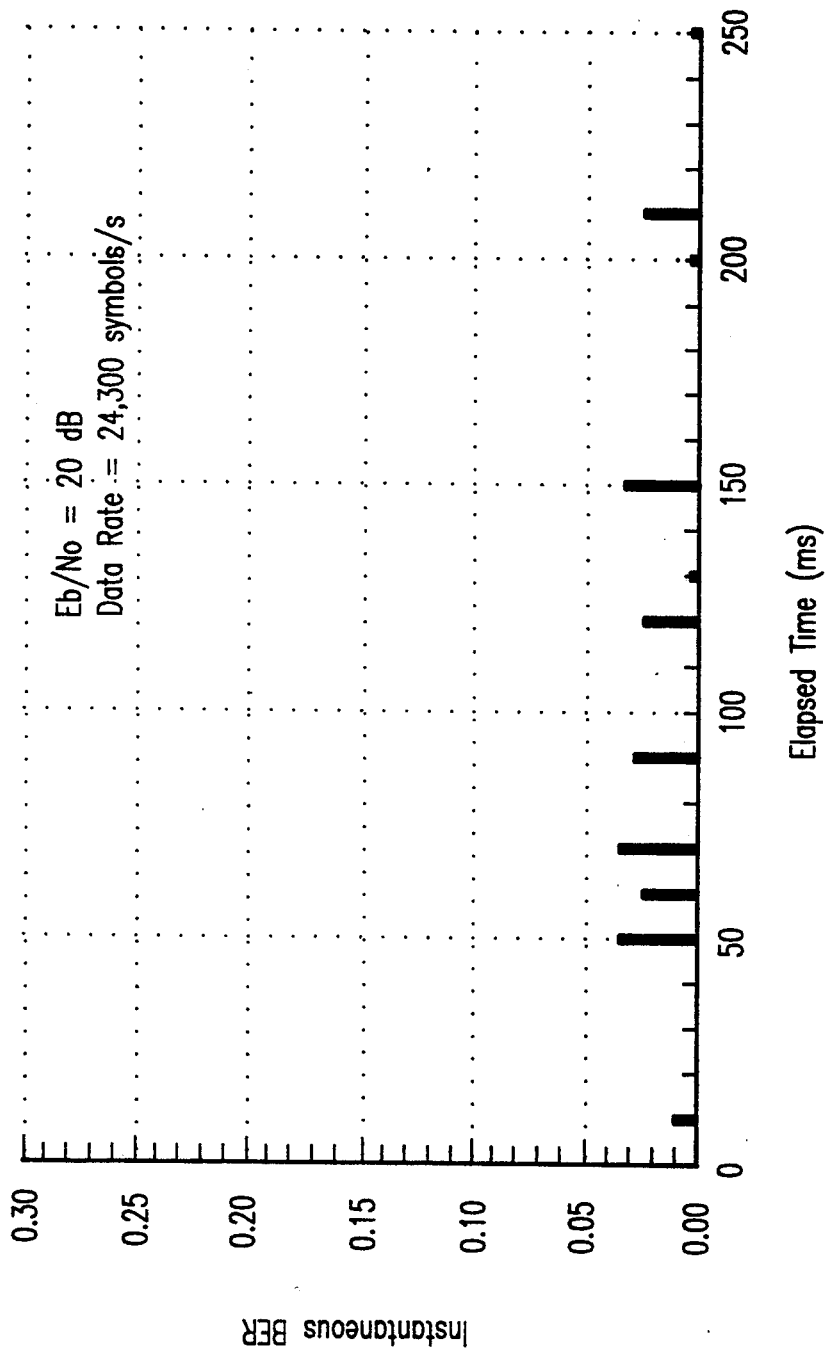
FIG. 15 is a graph showing instantaneous BER for $\pi/4$ DQPSK in a Rayleigh flat fading channel with $E_b/N_o = 20$ dB.
Figure 16:
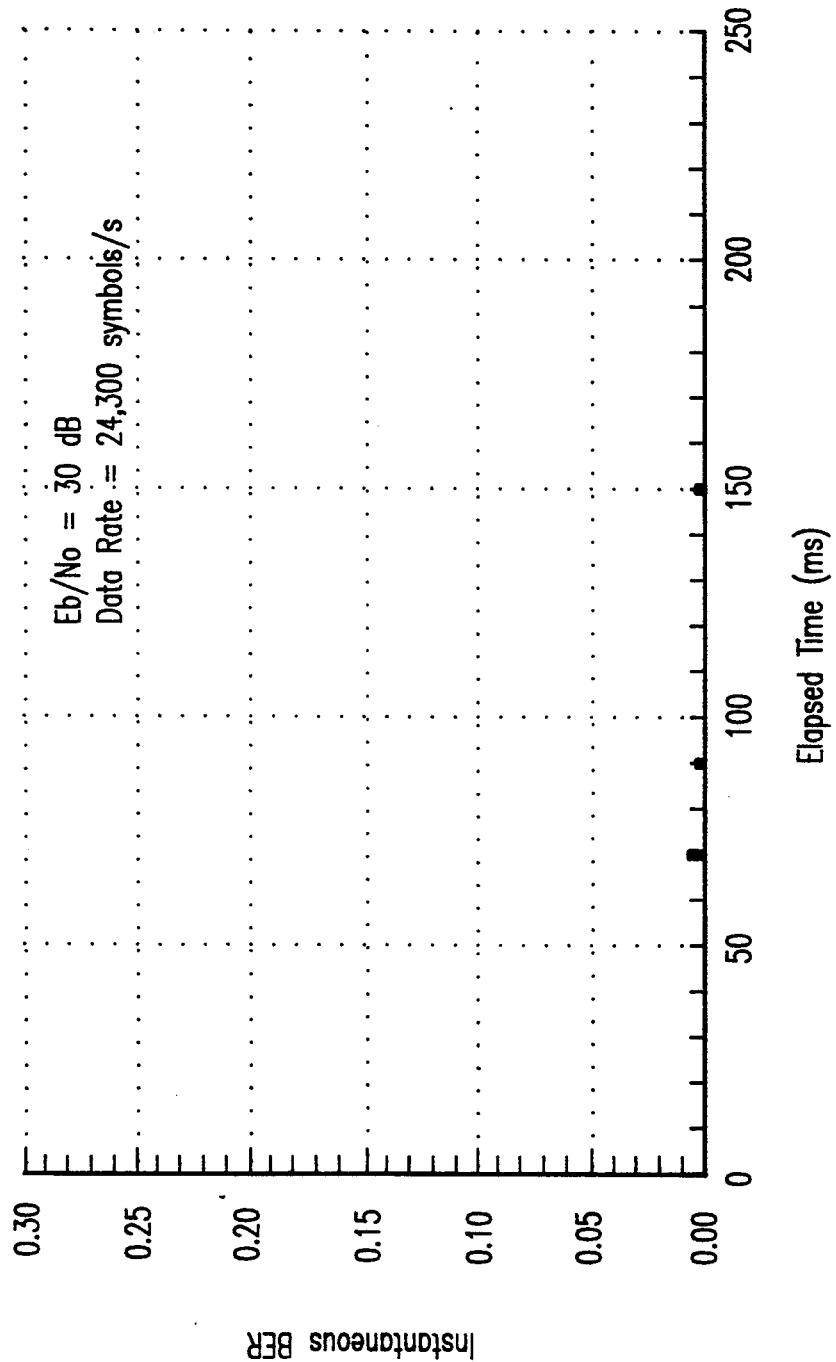
FIG. 16 is a graph showing instantaneous BER for $\pi/4$ DQPSK in a Rayleigh flat fading channel with $E_b/N_o = 30$ dB.

The use of channel models which have accurate second order fading statistics (i.e., level crossing rate) is important for the accurate prediction of burst errors in real channels. This can be seen in FIGS. 14, 15 and 16. FIG. 14, for example, illustrates the instantaneous BER for $\pi/4$ DQPSK operating at Eb/No of 10 dB which results form a flat Rayleigh fading channel model. The average BER, computed by averaging the instantaneous BER result over a 250 ms simulation interval, yields a result close to the theoretical Rayleigh fading result. FIG. 10 shows the corresponding Rayleigh flat fading envelope which yields the results in FIGS. 14 to 16. It can be seen in FIG. 14 that the times at which instantaneous BER increases is directly related to the spatial location of the receiver given in FIG. 10. That is, the high instantaneous BER values at the elapsed times of 50 ms, 60 ms, 70 ms, and 180 ms in FIG. 14 correspond exactly to the deep fades or fades with long duration at the same moment in FIG. 10. Even a high S/N ration of 30 dB, the deep fades (signal over 40 dB fading about the rms value) at the elapsed time of 70 ms, 90 ms and 150 ms still cause bit errors as indicated in FIG. 16.

While the invention has been described in terms of a single preferred embodiment, those skilled in the art will recognize that the invention can be practiced with modification within the spirit and scope of the appended claims. For example, while the preferred embodiment was implemented on a personal computer, it is difficult to simulate wireless data transmission having symbol rates in excess of five megabits per second or to perform the simulations in real time, given the clock speeds of most personal computers; therefore, the invention contemplates the use of more powerful computers and/or more advanced hardware, such as FIFO buffers, for some applications. In addition, the specific illustrative example was based on the U.S. digital cellular modulation, but the application of the invention is not limited to this particular communication media. For example, simulation of wireless spread spectrum communications that use trellis coding modulation techniques could be practices with the inventory.

Having thus described our invention, what we claim as new and desire to secure by Letters Patent is as follows:

1. A wireless digital communication system simulation system comprising:
   storage means for strong data representing computed bit error data;
   means for accessing said storage means to generate a bit error data stream $e_k$;
   means for inputting a data stream $d_k$ representing a data stream output of digital communication system;
   means responsive to said accessing means for combining said bit error data stream $e_k$ and said data stream $d_k$ and simulating operation of the digital communication system including a fading channel and interference signals and generating a data stream $d'_k$; and
   means for receiving data representing said data stream $d'_k$ for analysis.

2. The wireless digital communication system simulation system recited in claim 1 wherein said means for accessing said storage means to generate said data error stream $e_k$ comprises:
   means for addressing said storage means to read out said data representing said computed bit error data; and
   shift register means for converting said read out data to said data error stream $e_k$.

3. The wireless digital communication system simulation system recited in claim 2 further comprising:
   means for entering system parameters including modulation type, data rate and channel type;
   means for accessing said system parameters and simulating a communications channel to generate impulse response data of the communications channel;
   means for generating a predetermined number of pseudorandom symbols and performing signal mapping according to the modulation type to generate a first output;
   means for convolving said first output with said impulse response to said communications channel to generate a second output;
   means for adding noise to said second output; and
   means for detecting said second output and determining a number of bit errors to generate said stored data representing computed bit error data.

4. The wireless digital communication system simulation system recited in claim 3 further comprising:
   means for storing data of an impulse response of a first and second filters used for communication systems;
   means for convolving said first output with said impulse response to said first filter to generate an output which is convolve with said impulse response data of said communications channel to generate said second output; and
   means for convolving said second output with noise added with said impulse response of said second filter to generate said third output representing a received signal.

5. The wireless digital communication system simulation system recited in claim 4 further comprising means for generating co-channel interference before simulating said communication channel to generate its impulse response.

6. The wireless digital communication system simulation system recited in claim 1 wherein said means for combining said bit error data stream $e_d$ and said data stream $d_k$ performs an Exclusive OR function on said data streams to generate bit-by-bit said data stream $d'_k$.

7. A process for simulating a wireless digital communication system on a programmed digital computer comprising the steps of:
   entering system parameters including modulation type, data rate, multiple access technique, and channel type;
   accessing said system parameters and situating a communications channel to generate impulse response data of the communications channel;
   generating a predetermined number of pseudorandom symbols and performing signal mapping according to the modulation type to generate a first output;
   convolving said first output with said impulse response to said communications channel to generate a second output;
   adding noise to said second output; and
   detecting said second output and generating data representing computed bit error data from which a bit error data stream $e_k$ may be generated.

8. The process for simulating a wireless digital communication system recited in claim 7 further comprising the steps of:
   generating a bit error data stream $e_k$ from said data representing computed bit error data; and
   combining said bit error data stream $e_k$ and a data stream $d_k$ representing a data stream output of a wireless digital communication system to simulate operation of the wireless digital communication system including a fading channel and generating a data stream $d'_k$ as a result of combining said data streams $e_k$ and $d_k$.

9. The process for simulating a wireless digital communication system recited in claim 8 further comprising the step of determining a number of bit errors.

10. The process for simulating a wireless digital communication system recited in claim 9 wherein said step of determining a number of bit errors comprises the steps of:
    comparing the data representing said data streams $d_k$ and $d'_k$ to determine a bit error rate for said digital communication system including the fading channel; and
    determining an average bit error rate for a simulated received signal.

11. The process for simulating a wireless communications system recited in claim 7, further comprising the steps of:
    storing data of an impulse response of a first an second filters;
    convolving said first output with said impulse response of said first filter to generate an output which is convolved with said impulse response data of said communications channel to generate said second output; and
    convolving said second output with noise added with said impulse response to said second filter to generate said third output representing a received signal.

12. The process of simulating a wireless communications system recited in claim 11 further comprising the step of generating co-channel interference before simulating said communication channel to generate its impulse response.

* * * * *